(12) United States Patent
Kumazawa et al.

(10) Patent No.: US 7,542,883 B2
(45) Date of Patent: Jun. 2, 2009

(54) EVALUATION APPARATUS, EVALUATION METHOD AND COMPUTER PROGRAM PRODUCT

(75) Inventors: Toshimitsu Kumazawa, Yokohama (JP); Hideki Kobayashi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 569 days.

(21) Appl. No.: 11/082,101

(22) Filed: Mar. 17, 2005

(65) Prior Publication Data
US 2005/0222898 A1    Oct. 6, 2005

(30) Foreign Application Priority Data
Mar. 31, 2004    (JP)    ............................. 2004-103855
Sep. 29, 2004    (JP)    ............................. 2004-285002

(51) Int. Cl.
G06F 19/00    (2006.01)
G06F 7/60    (2006.01)
G06F 17/10    (2006.01)

(52) U.S. Cl. ............................. 703/2; 705/400; 700/97
(58) Field of Classification Search ..................... 703/6, 703/22; 700/96, 97; 705/7, 8, 400; 707/2, 707/3
See application file for complete search history.

(56) References Cited

U.S. PATENT DOCUMENTS

| | | | | |
|---|---|---|---|---|
| 6,324,527 | B1 * | 11/2001 | Bajuk et al. | 705/400 |
| 6,490,569 | B1 * | 12/2002 | Grune et al. | 705/400 |
| 6,529,788 | B1 * | 3/2003 | Tani et al. | 700/97 |
| 7,206,752 | B2 * | 4/2007 | Kobayashi | 705/8 |
| 7,219,042 | B2 * | 5/2007 | Kobayashi et al. | 703/6 |
| 2001/0029461 | A1 * | 10/2001 | Kobayashi | 705/8 |
| 2002/0002408 | A1 * | 1/2002 | Kobayashi et al. | 700/29 |

(Continued)

FOREIGN PATENT DOCUMENTS

JP    2001-344404    12/2001

(Continued)

OTHER PUBLICATIONS

Kumazawa et al. "Development of a Chemical Substance Management System." Proc. of the EcoDesign2003: Third Int'l Symposium on Environmentally Conscious Design and Inverse Manufacturing. pp. 402-403. Dec. 8-11, 2003.*

(Continued)

*Primary Examiner*—Paul L Rodriguez
*Assistant Examiner*—Dwin M Craig
(74) *Attorney, Agent, or Firm*—Oblon, Spivak, McClelland, Maier & Neustadt, P.C.

(57) ABSTRACT

An evaluation apparatus which evaluates environmental load of circulated life cycle in which group of products recovered from one of markets which differ from each other in value lifetime of group is introduced into another of markets, cost thereof and profit thereof generates attribute data of group, attribute data of group including remaining useful lifetime and product age, determinates introduction order and introduction rule which are used for introducing group into markets, based on remaining useful lifetime at point in time when group is recovered from one of markets and remaining value lifetime of group which is obtained by subtracting product age at point in time when group is recovered from one of markets from value lifetime of another of markets, and evaluates environmental load of circulated life cycle in which group is introduced into markets in accordance with introduction order and rule, cost thereof and profit thereof.

11 Claims, 30 Drawing Sheets

U.S. PATENT DOCUMENTS

| | | | |
|---|---|---|---|
| 2002/0042731 A1* | 4/2002 | King et al. | 705/10 |
| 2003/0125999 A1 | 7/2003 | Kobayashi et al. | |
| 2003/0236776 A1* | 12/2003 | Nishimura et al. | 707/3 |
| 2004/0054516 A1* | 3/2004 | Oyasato et al. | 703/22 |
| 2005/0216249 A1* | 9/2005 | Kobayashi et al. | 703/22 |

FOREIGN PATENT DOCUMENTS

| JP | 2002-269194 | 9/2002 |
|---|---|---|

OTHER PUBLICATIONS

Kumazawa et al. "Feasibility Study on Sustainable Manufacturing System." Proc. of the EcoDesign2003: Third Int'l Symposium on Environmentally Conscious Design and Inverse Manufacturing. pp. 517-520. Dec. 8-11, 2003.*

Umeda et al. "Special Issue on Engineering Informatics for Eco-Design." Advanced Engineering Informatics, vol. 20, p. 111, 2006.*

Kumazawa et al. "A Simulation System to Support the Establishment of Circulated Business." Advanced Engineering Informatics, vol. 20, pp. 127-136, 2006.*

Kobayashi et al. "A Systematic Approach to Eco-Innovative Product Design Based on Life Cycle Planning." Advanced Engineering Informatics, vol. 20, pp. 113-125, 2006.*

Shinya Hatakenaka, et al. "Cost-Benefit Analysis of Recycling by Life-Cycle Simulation". Journal of the Japan Society of Mechanical Engineers, Aug. 2001, vol. 62, No. 660, pp. 338-344.

* cited by examiner

FIG. 2

Calculation conditions

| Calculation product unit | 100 products/entity |
|---|---|
| Calculation step time | Month |
| Calculation period | 180 months |
| Depreciation period | 60 months |
| Depreciation method | Fixed rate method |
| Discount rate | 5% |

FIG. 6

Market segment

| Segment name | Value lifetime | Product use frequency coefficient |
|---|---|---|
| Corporation | 24 months | 1 |
| Individual and home | 48 months | 0.2 |
| Educational facility | 72 months | 0.4 |

FIG. 7

Product data

| Product name | Product mass | Useful lifetime | Component configuration |
|---|---|---|---|
| Personal computer B | 9 kg | 120 months | Omitted |

FIG. 8

Component data

| Component name | Product mass | Useful lifetime | Material used |
|---|---|---|---|
| Storage device | 1 kg | 48 months | Omitted |
| Main substrate | 3 kg | 72 months | Omitted |
| Housing | 4 kg | 240 months | Omitted |
| CPU | 0.5 kg | 72 months | Omitted |
| Keyboard | 0.5 kg | 180 months | Omitted |

Background environmental load

| Item | Occurrence period | Occurrence interval | Stakeholder | Material | Material usage amount |
|---|---|---|---|---|---|
| Electricity | 1st to 180th month | Every other month | Manufacturer | Economical power | 20KWn |

FIG. 3

Background cost and profit

| Item | Occurrence period | Occurrence interval | Stakeholder | Type | Amount |
|---|---|---|---|---|---|
| Fixed property tax | 1st to 180th month | Every 6 months | Manufacturer | Cost | 300,000 |
| Grant | 1st to 180th month | Every 12 months | Processor | Profit | 12,000,000 |

FIG. 4

Sale and recovery plan data

| Market segment | Customer | Business form | Product | Number of products distributed | Distribution period | Period of use | Price |
|---|---|---|---|---|---|---|---|
| Corporation | Company B | Reuse | Personal computer B | 300 products | 0th month | 24 months | 6000 yen/month |
| Individual and home | Mr. or Ms. D | Reuse | Personal computer B | 200 products | 25th month | 24 months | 4000 yen/month |
| Educational facility | School E | Reuse | Personal computer B | 200 products | 25th month | 24 months | 3000 yen/month |

FIG. 5

Market introduction rule

0th-month

| | Market segment | Customer | Business form | Product | Period of use | Number of reuses | Production time | Remaining useful lifetime of product | Product age |
|---|---|---|---|---|---|---|---|---|---|
| Entity 1 | Corporation | Company A | Reuse | Personal computer B | 24 | 0 | 0 | 120 | 0 |
| Entity 2 | Corporation | Company A | Reuse | Personal computer B | 24 | 0 | 0 | 120 | 0 |
| Entity 3 | Corporation | Company A | Reuse | Personal computer B | 24 | 0 | 0 | 120 | 0 |

FIG. 14

| Unit | Entity 1 | | | Entity 2 | | | Entity 3 | | |
|---|---|---|---|---|---|---|---|---|---|
| | Number of reuses | Production time | Remaining useful lifetime of component | Number of reuses | Production time | Remaining useful lifetime of component | Number of reuses | Production time | Remaining useful lifetime of component |
| Storage device | 0 | 0 | 48 | 0 | 0 | 48 | 0 | 0 | 48 |
| Main substrate | 0 | 0 | 72 | 0 | 0 | 72 | 0 | 0 | 72 |
| Housing | 0 | 0 | 240 | 0 | 0 | 240 | 0 | 0 | 240 |
| CPU | 0 | 0 | 72 | 0 | 0 | 72 | 0 | 0 | 72 |
| Keyboard | 0 | 0 | 180 | 0 | 0 | 180 | 0 | 0 | 180 |

25th month

| | Market segment | Customer | Business form | Product | Period of use | Number of RFs | Production time | Remaining useful lifetime of product |
|---|---|---|---|---|---|---|---|---|
| Entity 1 | Individual and home | Mr. or Ms. D | Reuse | Personal computer B | 24 | 1 | 0 | 96 |
| Entity 2 | Individual and home | Mr. or Ms. D | Reuse | Personal computer B | 24 | 1 | 0 | 96 |
| Entity 3 | Educational facility | School E | Reuse | Personal computer B | 24 | 0 | 0 | 96 |
| Entity 4 | Educational facility | School E | Reuse | Personal computer B | 24 | 0 | 24 | 120 |

FIG. 17

| | Entity 1 | | | Entity 2 | | | Entity 3 | | | Entity 4 | | |
|---|---|---|---|---|---|---|---|---|---|---|---|---|
| Unit | Number of reuses | Production time | Remaining useful lifetime of component | Number of reuses | Production time | Remaining useful lifetime of component | Number of reuses | Production time | Remaining useful lifetime of component | Number of reuses | Production time | Remaining useful lifetime of component |
| Storage device | 1 | 0 | 24 | 1 | 0 | 24 | 1 | 0 | 24 | 0 | 24 | 48 |
| Main substrate | 1 | 0 | 48 | 1 | 0 | 48 | 1 | 0 | 48 | 0 | 24 | 72 |
| Housing | 1 | 0 | 216 | 1 | 0 | 216 | 1 | 0 | 216 | 0 | 24 | 240 |
| CPU | 1 | 0 | 48 | 1 | 0 | 48 | 1 | 0 | 48 | 0 | 24 | 72 |
| Keyboard | 1 | 0 | 156 | 1 | 0 | 156 | 1 | 0 | 156 | 0 | 24 | 180 |

| | | Reusable age | Priority |
|---|---|---|---|
| Introduction target market | Market a | 0 | ✕ |
| | Market b | 0~2 | ① |
| | Market c | 0~4 | ② |
| | Market d | 2~6 | ③ |

F I G. 32

EVALUATION APPARATUS, EVALUATION METHOD AND COMPUTER PROGRAM PRODUCT

CROSS-REFERENCE TO RELATED APPLICATIONS

This application is based upon and claims the benefit of priority from prior Japanese Patent Applications No. 2004-103855, filed Mar. 31, 2004; and No. 2004-285002, filed Sep. 29, 2004, the entire contents of both of which are incorporated herein by reference.

BACKGROUND OF THE INVENTION

1. Field of the Invention

The present invention relates to an evaluation apparatus and method that evaluates the environmental load of a circulated life cycle in which a group of products recovered from one of a plurality of markets is introduced into another market, cost thereof and profit thereof.

2. Description of the Related Art

People are deepening their understanding of how critical environment problems are; they now consider that one of the most important objects is to construct a circulated system at every level including national government, local government, and corporations. With a circulated system, it is effective to reuse the functions of products and components rather than recycling materials. Thus, in recent years, makers have recovered and disassembled used products and reused the resulting components for new products; this process is typical of single-use lenses. This reuse is now desired to be applied to other industrial products.

To establish the reuse as a business, it is necessary to quantitatively pre-evaluate how the reuse changes business profits and an environmental load. The point in evaluating the reuse business is to accurately estimate the balance between reuse products and demand for them and the supply and demand balance between the number of reused components supplied and the number of components required which is derived from the production of products into which the components are integrated. That is, if the number of reuse products or components is small compared to the number of reuse products or components required, the number of products or components newly produced must be increased. In contrast, if the number of reuse products or components is excessive, the surplus products or components must be kept in stock or must be recycled or disposed of. Thus, a technique has been disclosed which simulates the relationship between the supply and demand for reuse products or components within a product family as well as the effects of the relationship on the business (see, for example, Jpn. Pat. Appln. KOKAI Publication No. 2002-117106).

As a conventional technique for evaluating the impacts of reuse, a method has been disclosed which identifies products to be reused before calculating impacts on the environment and business profits (see, for example, "Analysis of Costs/Utilities of Material Circulated on Life Cycle Simulation", Murayama et al., Hiroshima University, Journal of The Japan Society of Mechanical Engineers, Vol. 67, No. 660 (2002-8)). However, this method does not enable unique calculations if for example, there are a plurality of candidates for products into which reused components are to be integrated.

Thus, the conventional techniques evaluate the environmental load, cost and profit of a circulated product life cycle that targets one market in reusing products or components or recycling materials. Disadvantageously, the conventional techniques cannot evaluate a circulated product life cycle that targets a plurality of markets.

It is an object of the present invention to provide an evaluation apparatus and a method that can easily and efficiently evaluate environmental load of a circulated life cycle that targets a plurality of markets, cost thereof and profit thereof.

BRIEF SUMMARY OF THE INVENTION

According to embodiments of the present invention, an evaluation apparatus which evaluates an environmental load of a circulated life cycle in which a group of products recovered from one of a plurality of markets which differ from each other in value lifetime of the group is introduced into another of the markets, cost thereof and profit thereof: generates an attribute data item of the group, the attribute data item of the group including a remaining useful lifetime and a product age; determines an introduction order and an introduction rule which are used for introducing the group into the markets, based on the remaining useful lifetime at point in time when the group is recovered from one of the markets and a remaining value lifetime of the group which is obtained by subtracting the product age at point in time when the group is recovered from one of the markets from a value lifetime of another of the markets; and evaluates the environmental load of the circulated life cycle in which the group is introduced into the markets in accordance with the introduction order and rule, the cost thereof and the profit thereof.

BRIEF DESCRIPTION OF THE SEVERAL VIEWS OF THE DRAWING

FIG. 2 is a diagram showing an example showing an example of calculation condition data;

FIG. 3 is a diagram showing an example of background environmental load data;

FIG. 4 is a diagram showing an example of background cost and profit data;

FIG. 5 is a diagram showing an example of sale and recovery plan data;

FIG. 6 is a diagram showing an example of market segment data;

FIG. 7 is a diagram showing an example of product data;

FIG. 8 is a diagram showing an example of component data;

FIG. 14 is an attribute table that stores attribute data on entities in a 0th month;

FIG. 15 is a diagram showing attribute data on components;

FIG. 16 is an attribute table that stores attribute data on entities in a 25th month;

FIG. 17 is a diagram showing attribute data on components;

FIG. 32 is a diagram illustrating a second method for determining a market introduction rule;

DETAILED DESCRIPTION OF THE INVENTION

An embodiment of the present invention will be described below with reference to the drawings.

Figure 1:
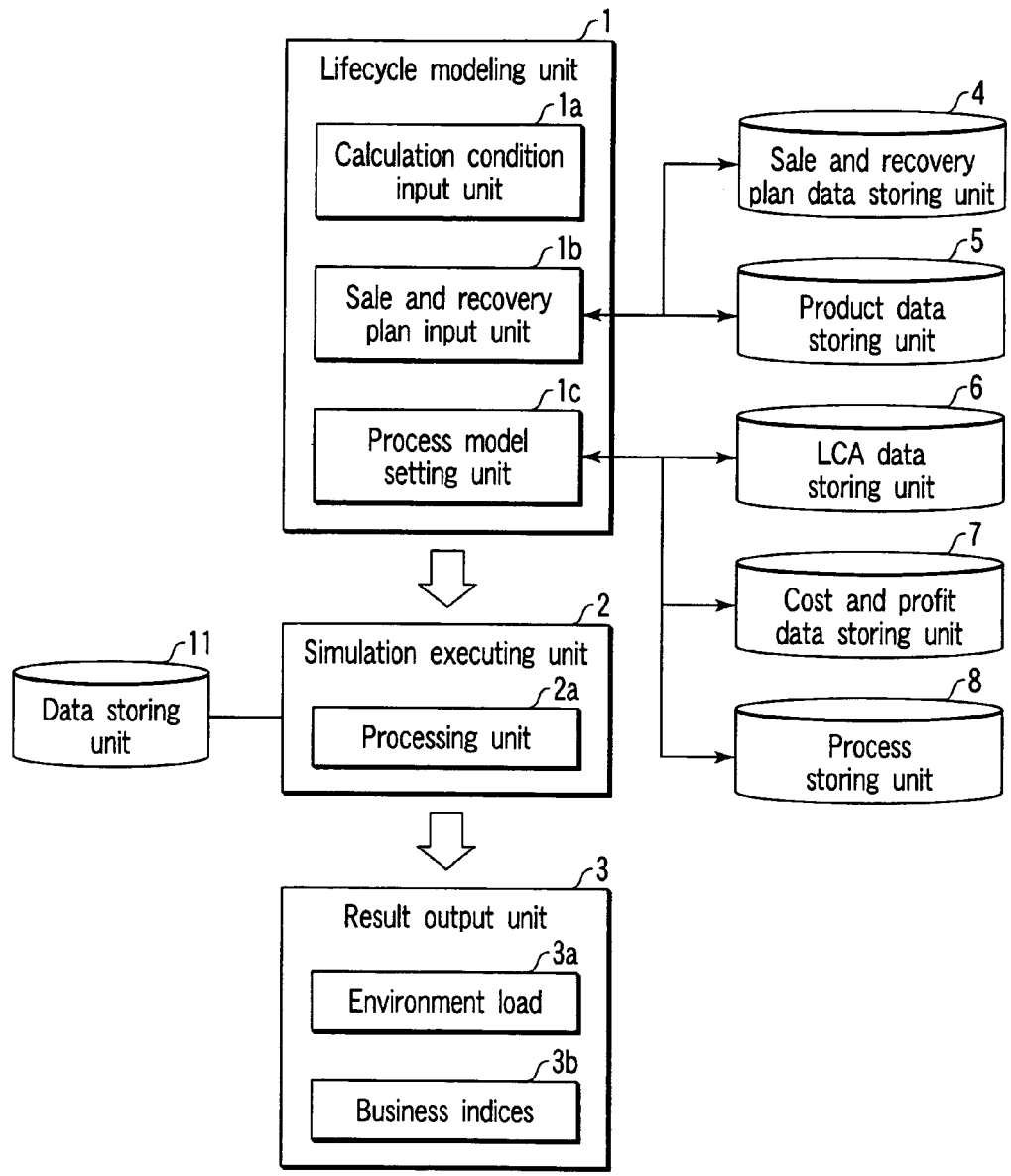
FIG. 1 is a diagram showing an example of the configuration of a circulated business evaluation system according to an embodiment of the present invention.

FIG. 1 shows an example of the configuration of a circulated business evaluation system according to the present embodiment.

The present system is roughly composed of a life cycle modeling unit 1, a simulation executing unit 2, a result output unit 3, a sale and recovery plan data storing unit 4, a product data storing unit 5, an LCA data storing unit 6, a cost and profit data storing unit 7, and a process storing unit 8.

The life cycle modeling unit 1 includes a calculation condition input unit 1a used to input conditions for simulation calculations, a background environmental load, and background costs and profits, a sale and recovery plan input unit 1b to which sale and recovery plan data, market segment data, product data, component data, and the like are input, and a process model setting unit 1c that sets a process flow based on a product life cycle.

The sale and recovery plan data are stored in the sale and recovery plan data storing unit 4. The product data and the component data are stored in the product data storing unit 5.

The process storing unit 8 stores various processes required to set a desired process flow.

The process model setting unit 1c uses the processes stored in the process storing unit 8 to set (generate) a desired process flow. Moreover, a market introduction rule, described later, is determined from the sale and recovery plan data.

The simulation execution unit 2 includes a processing unit 2a that simultaneously simulates a material flow and a cache flow on the basis of the process flow set by the process model setting unit 1c and the various data. The life cycle assessment (LCA) data storing unit 6 stores LCA data such as the basic unit of the environmental load which are required to simulate the material flow. The cost and profit data storing unit 7 stores basic data on costs and profits which are required to simulate the cash flow.

The result output unit 3 has a given display device to present a user with environmental loads and business indices (results of calculations of costs and profits) resulting from the simulations.

To execute a simulation, an evaluation model is first defined. The evaluation model is defined using calculation conditions, a sale and recovery plan, a process flow, and a product market introduction rule.

Taking the case of a personal computer reuse and rental business, description will be given below of a circulated business evaluation apparatus that evaluates the environmental load of a circulated business targeting a plurality of segments such as corporations, individuals and homes, and educational facilities, cost thereof and profit thereof.

Here, the term "circulated product life cycle" refers to a product life cycle in which products recovered from one of a plurality of markets as well as components of the products are reused and introduced into another of the plurality of markets. Further, the term "circulated business" refers to a business that reuses and introduces products recovered from one of a plurality of markets as well as components of the products, into another of the plurality of markets.

FIG. 2 shows an example of calculation condition data input from the calculation condition input unit 1a. The calculation condition data include a calculation product unit, a calculation step time, a calculation period, a depreciation period, a depreciation method, and a discount rate. The calculation product unit indicates how many products are calculated as one unit (entity) during simulation. In this case, the calculation product unit includes 100 products. Accordingly, when an entity is generated, the initial value of the number of products included in one entity is 100. The calculation step time is a unit calculation time for the simulation. Here, the calculation step time is one month. The calculation period is a period for which the simulation is executed. The depreciation period, the depreciation method, and the discount rate indicate a method for calculating costs and profits.

As calculation conditions, background environmental load data such as those shown in FIG. 3 and background cost and profit data such as those shown in FIG. 4 are further input from the calculation condition input unit 1a. These data specify an environmental load and cost and profit that do not depend on a process flow, using an occurrence period, an occurrence interval, a stakeholder, a material use cost, the amount of money, and the like. The term "stakeholder" as used herein refers to an organization or individual that bears the environmental load, cost and profit.

FIG. 5 shows an example of sale and recovery plan data input from the sale and recovery plan input unit 1b. One plan is expressed by specifying eight items including a "market segment", a "client", a "business form", a "product", a "distribution number", a "distribution period", a "use period", and a "price". Specifically, the "market segment", "client", "business form", "product", "distribution number", "distribution period", "use period", and "price" are indicated for each of a plurality of markets (in this case, three market segments for "corporations", "individuals and homes", and "educational facilities") targeted by the business.

As shown in FIG. 6, a "product value lifetime" and a "product use frequency coefficient" are specified for each market segment. The "product use frequency coefficient" is used to convert a remaining useful lifetime in one market segment into a remaining useful lifetime in another market segment by dividing the remaining useful lifetime in the one market segment by the "product use frequency coefficient" of another market segment. In this case, the "corporation" segment is a reference segment, and the product use frequency coefficient thereof is "1".

For the "business form", a method for supplying products is specified, such as reuse or sell. For the "product", each product to be introduced into the market is specified. In this case, the product called a "personal computer B" is specified. For each product, a "product mass", a "useful lifetime of product, and a "component configuration" are specified using product data such as those shown in FIG. 7. For the "component configuration", the name and number of each component of the product are specified. Moreover, for each product, a "component mass", a "useful lifetime of component", and a "material used" are specified using component data such as those shown in FIG. 8. For the "material used", the name and amount of each material used to manufacture the product are specified.

Product data such as those shown in FIG. 7 and component data such as those shown in FIG. 8 may be stored in the product data storing unit 5. The user inputs sale and recovery plan data such as those shown in FIG. 5 and market segment data such as those shown in FIG. 6, from the sale and recovery plan input unit 16.

Figure 9:
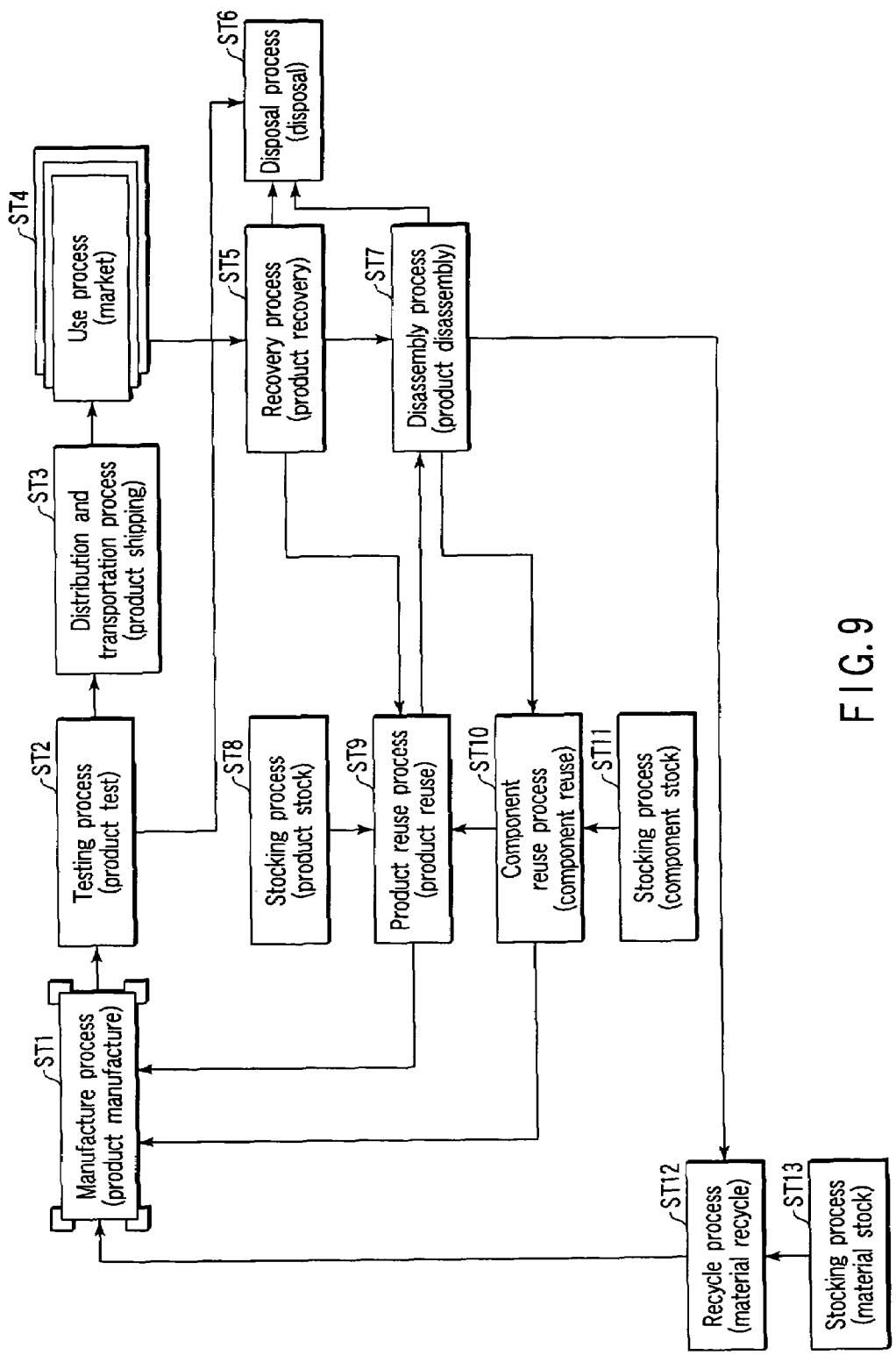
FIG. 9 is a diagram showing an example of a process flow.

FIG. 9 shows a process flow generated by a process model setting unit 1c. The process flow is a graph illustrated by process nodes for a plurality of processes corresponding to a plurality of stages included in the life cycle of a product (in this case, for example, the personal computer B) and connectors each showing the direction of a flow from one process node to another as shown in FIG. 9. Each process node is in template form and has items corresponding to the type of the process. For example, the user selects desired processes and uses connectors to connect the processes together. The user thus sets a process flow such as the one shown in FIG. 9.

The life cycle of the personal computer B includes a product manufacture stage ST1, a product testing stage ST2, a product shipping stage ST3, a market stage ST4, a product recovery stage ST5, a disposal stage ST6, a product disassembly stage ST7, a product stock stage ST8, a product reuse stage ST9, a component reuse stage ST10, a component stock stage ST11, a material recycle stage ST12, and a material stock stage ST13. In this case, the market stage ST4 is characterized by involving a plurality of markets (for example, in this case, the three markets for "corporations", "individuals and homes", and "educational facilities") instead of one market.

The process flow includes processes corresponding to the above stages of the product life cycle, that is, a manufacture process, a testing process, a distribution and transportation process, a use process, a recovery process, a disposal process, a product disassembly process, a stock (product) process, a product reuse process, a component reuse process, a stock (component) process, a recycle process, and a stock (material) process. The simulation executing unit 2 executes these processes to simulate a circulated product life cycle.

In order to be introduced into a market having the shortest useful lifetime among the three markets ("corporation" segment), newly manufactured products (in the process flow, an entity having, for example, a group of 100 products as a unit) flow through the product manufacture stage ST1, the product testing stage ST2, the product shipping stage ST3, the market stage ST4 corresponding to the "corporation" segment, and the product recovery stage ST5 to the product stock stage ST8. Thus, the first life cycle (for the entity) is finished.

According to the present embodiment, products recovered from a certain market are diverted to one of the product reuse stage ST9, product disassembly stage ST7 (via which the products are passed to the component reuse stage ST10), and disposal stage ST6 based on remaining useful lifetime and product age of the products recovered from the certain market.

The useful lifetime is a period in which the failure rate of the product is maintained at most a specified value. The value lifetime is a period in which the value of the product determined by users (market) is maintained. The remaining useful lifetime is a useful lifetime pre-specified for the product when the product has been newly manufactured and has not been introduced into any markets yet. When the product is introduced into and then recovered from one of the markets, its remaining useful lifetime can be found by subtracting the period of use in the market from which the product is recovered, from the remaining useful lifetime of the product.

The product age is the time that has passed since the manufacture of the product (in this time, the product age is represented by the number of months elapsed because the calculation step time is one month). That is, when the time (in this case, month) at which the product is manufactured is defined as a production time, the product age is determined by subtracting the production time from the current time "nth month" (n is 0, 1, 2, ... ).

The remaining value lifetime of the product is determined by comparing the product age of the product with a value lifetime pre-specified for each market. Specifically, the remaining value lifetime can be determined by subtracting the current product age of the product from the value lifetime for each market.

A product introduction order indicates priorities given to the plurality of markets in connection with the introduction of products recovered. The product introduction order is determined on the basis of the remaining useful lifetime and product age of the product and the value lifetime, product use frequency coefficient, and period of use specified for each market (on the basis of sale and recovery plan data such as those shown in FIG. 5).

For products recovered from the "corporation" segment, when the remaining useful lifetime and product age of the product are calculated and the next market (for example, the "individual and home" segment) is selected as described, the second life cycle is started to introduce the products into the latter market.

For the products recovered from the "individual and home" segment, the remaining useful lifetime and product age of the product is also calculated and the next market for introduction (for example, the "educational facility" segment) is also selected as described, the third life cycle is started to introduce the products into the latter market.

The plurality of markets results from classification based on differences in customer requirements such as requirement specifications for the value lifetime, performance, and functions of the product. When the markets are classified on the basis of, for example, the value lifetime, they can be classified into a first market having the shortest value lifetime, a second market having a longer value lifetime than the first market, a third market having a longer value lifetime than the second market, . . . The description below takes the case of classification based on differences in value lifetime, which is one of the customer requirements. Specifically, the first market (user) is corporations, the second market is individuals and homes, and the third market is educational facilities. The market segment data shown in FIG. 6 shows that the value lifetime is 24 months in the "corporation" segment, 48 months in the "individual and home" segment, and 72 months in the "educational facility" segment.

Figures 10, 11:
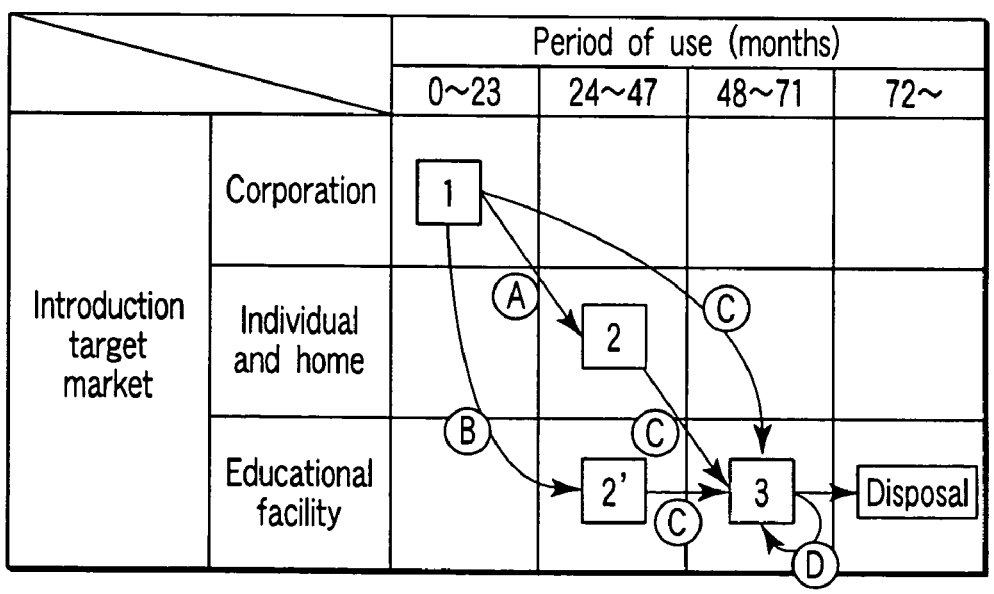
FIG. 10 is a diagram showing products that can be introduced into each market segment as well as their priorities.
FIG. 11 is a diagram schematically showing a market introduction rule.

FIG. 10 shows products which are obtained from FIG. 6 and which can be introduced into the markets as well as their priorities. FIG. 11 shows a market introduction rule indicating an introduction order and an introduction route determined on the basis of, for example, priorities based on the product age and value lifetime such as those shown in FIG. 10, the sale and recovery plan data shown in FIG. 5 (mainly the period of use in each market), and the useful lifetime pre-specified for the product.

Here, the introduction order is determined on the basis of the remaining useful lifetime and remaining value lifetime of the product at the time when a period of use specified for each market has elapsed. That is, the remaining useful lifetime and remaining value lifetime of the product at the time when a period of use specified for each market has elapsed are calculated. Then, the introduction order of the markets is determined in order of increasing the remaining value lifetime of the product in each market the product is introduced while the remaining useful time of the product is at least one month.

As previously described, the remaining value lifetime of the product in each market is determined by subtracting the current product age of the product from the value lifetime in the market. On the other hand, it is possible to determine into which market the product is to be introduced, as in the case of the use of the value lifetime, by setting, for each market, a value obtained by subtracting the period of use in the market from the value lifetime pre-specified for the market, as the upper limit value of the product age at which the product can be reused for the market, and then comparing the value with the product age of the product.

For example, the process model setting unit 1c subtracts the period of use in each market from the value lifetime pre-specified for the market to determine the upper limit value of the product age at which the product can be reused for the market.

FIG. 11 schematically shows the introduction order and route of a group of products thus determined for each market, that is, a market introduction rule.

According to the market introduction rule shown in FIG. 11, newly manufactured products are introduced into the "corporation" segment, having the shortest value lifetime, whereas no reuse products are introduced into the "corporation" segment. Further, products with lower product ages are introduced into markets with shorter value lifetimes.

Of the "individual and home" segment and the "educational facility" segment, the "individual and home" segment is the first one into which products recovered from the "corporation" segment after being used for 24 months from the 0th month (product age: at least 24 months) are introduced. Products of the same product age are given priority in introduction into the "individual and home" segment (introduction route A). Products recovered from the "corporation" segment are not introduced into the "educational facility" segment until a required number of products are distributed to the "individual and home" segment (introduction route B). Products recovered from the "individual and home" segment after being used for 24 months from the 24th month (product age: at least 24 months and at most 47 months) are introduced into the "educational facility" segment (introduction route C). The highest priority is given to the introduction route A and the next highest priorities are given to the introduction routes B, C, and D in this order.

According to the market introduction rule shown in FIG. 11, the introduction order is determined on the basis of the remaining useful lifetime and remaining value lifetime of the product at the time when a period of use specified for each market has elapsed; products having the remaining useful lifetime of at least one month are introduced into market in which the remaining value lifetime of the products is the shortest. However, the present invention is not limited to this. The user may specify an introduction order for the plurality of markets or the introduction order for the markets may be such that products are sequentially introduced into the markets in order of increasing value lifetime pre-specified for each market. The introduction order for the markets may be such that products are sequentially introduced into the markets in order of decreasing remaining useful lifetime of the products in each of the markets at the time when the period of use in the each of the markets have elapsed.

Moreover, products may be sequentially introduced into the markets in order of increasing gross profit. The gross profit is obtained by subtracting the total costs of the stages of the product life cycle from sales. However, for rental businesses, if the costs are almost the same regardless of the market into which products are introduced, the sales increases with increasing rental rate (rental rate per month multiplied by period of use). In other words, a market has more gross profit if the use process makes more profit.

It is thus possible to select the market that has the most profit made by the use process, specifically, the market having the highest rental rate obtained by multiplying the component price of the rental rate per month contained in the sale and recovery plan data shown in FIG. 5, by the period of use in the market.

Moreover, a plurality of the above market introduction rules may be combined together. For example, if there are a plurality of markets of the same priority (for example, the plurality of markets in which the remaining useful lifetime of the products or the remaining value lifetime of the products at the time when the period of use specified for each market have elapsed are the same), products are first introduced into one of the markets which has the most profit made by the use process, specifically, the market having the highest rental rate.

Description will be described below of variations of a method for determining a market introduction rule which method is executed by the process model setting unit 1c. For markets a to d, the value lifetime increases in this order.

(First Method)

Figure 31:
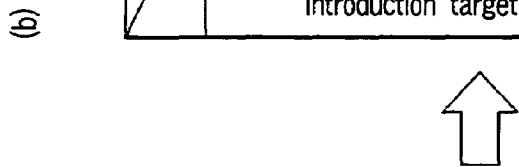
FIG. 31 is a diagram illustrating a first method for determining a market introduction rule.

The product age at which products can be reused in each market and the priority for the market in introduction of reuse products are specified as shown in FIG. 31(a) to determine the order in which the reuse products are introduced into the markets as shown in FIG. 31(b).

The first method corresponds to the determination of the market introduction rule shown in FIG. 11, from the information shown in FIG. 10.

The upper limit value of the product age at which products can be reused in each market is obtained by subtracting the period of use in the market from the value lifetime prespecified for the market.

FIG. 31(a) shows that newly manufactured products are introduced into the market a (that has the shortest value lifetime) and shows, for each product age of reuse products (the product age is shown in years), the order in which products (reuse products) recovered from the market a are introduced into the markets b to d. For example, reuse products of product age at most 2 years can be introduced into the markets b and c in this order. If the product age is higher than 2 years and at most 4 years, the products can be introduced into the markets c and d in this order. If the product age is higher than 4 years and at most 6 years, the products can be introduced into the market d.

According to the market introduction rule shown in FIG. 31(b), products recovered from the market a after being used for 2 years from the 0th year (reuse products of product age 2 years) are introduced into the markets b, c, and d in this order. Products recovered from the market b or c after being used for 2 years from the 2nd year (reuse products of product age 4 years) are introduced into the markets c and d in this order. Products recovered from the market c or d after being used for 2 years from the 4th year (reuse products of product age 6 years) are introduced into the market d.

(Second Method)

With the first method, if the product ages at which products can be reused in the respective markets are continuous and a priority is specified for each market (the priority does not vary with the product ages), the table shown in FIG. 31(a) can be more simply expressed using a smaller number of data as shown in FIG. 32. Specifically, like FIG. 31(a), FIG. 32 shows that products recovered from the market a (reuse products) are introduced into the markets b, c, and d in this order and that reuse products of product age at most 2 years are introduced into the market b and that reuse products of product age at most 4 years are introduced into the market c and that reuse products of product age at least 2 years and at most 6 years are introduced into the market d.

(Third Method)

As shown in FIG. 33(a), next markets in which reuse products can be used are specified to determine a market introduction rule as shown in FIG. 33(b).

FIG. 33(a) shows, on a matrix, that reuse products used in the market a are introduced into the market b and that reuse products used in the market b are introduced into the markets b, c, and d and that reuse products used in the market c are introduced into the market d.

A market introduction rule such as the one shown in FIG. 33(b) is determined on the basis of the information shown in FIG. 33(a) and the period of use and product useful lifetime in each market.

According to the market introduction rule shown in FIG. 33(b), all the products recovered from the market a after being used for 2 years from the 0th year (reuse products of product age 2 years) are introduced into the market b from FIG. 33(a). Products recovered from the market b after being used for 2 years from the 2nd year are introduced into the markets b, c, and d in this order. Products recovered from the market b after being used for 2 years from the 4th year are introduced into the markets b and c in this order. Products recovered from the market c after being used for 2 years from the 4th year are introduced into the market d. All the products used in the market d are disposed of because the next market into which the products are to be introduced is not specified.

(Fourth Method)

A market introduction rule more detailed than one obtained by the third method as shown in FIG. 34(b), by specifying next markets in which reuse products can be used, priorities for the markets in which the reuse products can be used, and the product age at which reuse products can be reused in each market, as shown in FIG. 34(a).

A market introduction rule indicating the flow of reuse products shown in FIG. 34(b) is obtained by determining the next market into which reuse products recovered from each market after being used are to be introduced, on the basis of the product age at which reuse products can be reused in each market as well as the priorities, as shown in FIG. 34(a).

Figure 35:
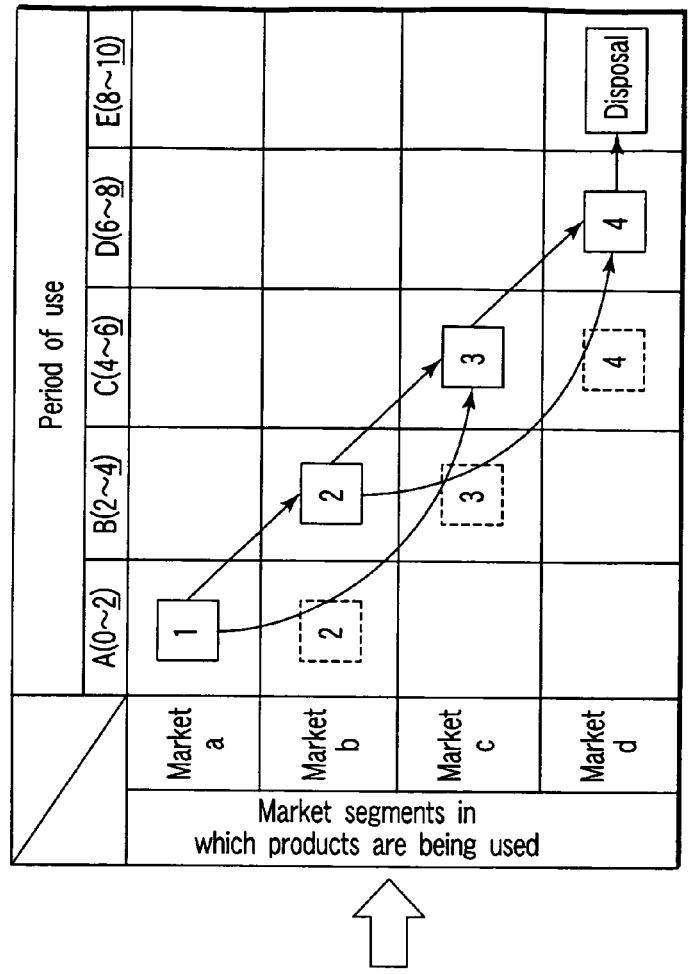
FIG. 35 is a diagram illustrating an example of a method for specifying priorities for markets into which reuse products are to be introduced, in connection with the fourth process for determining a market introduction rule.
Figure 36:
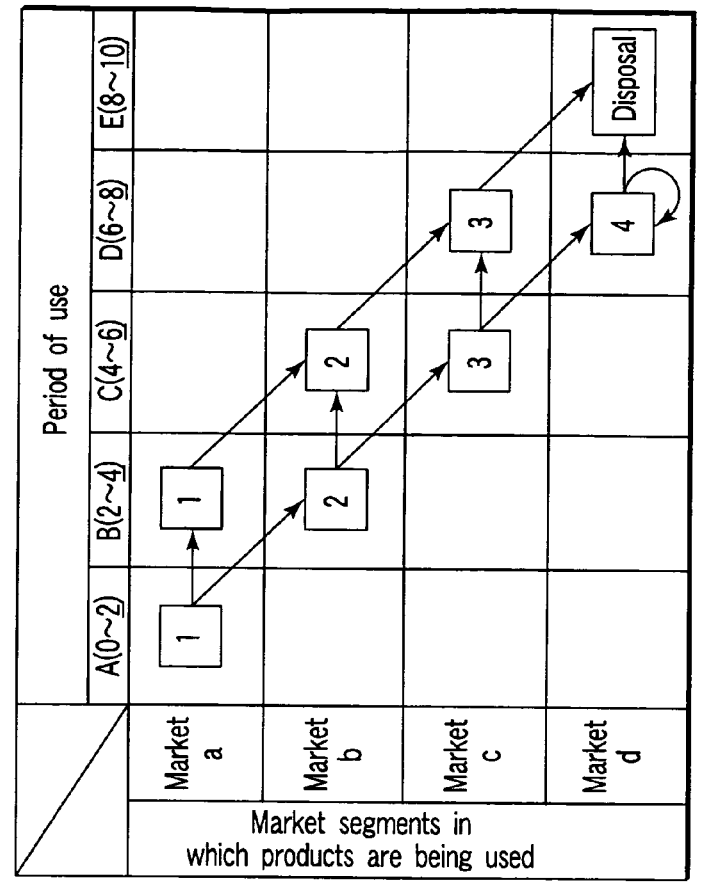
FIG. 36 is a diagram illustrating another example of a method for specifying priorities for markets into which reuse products are to be introduced, in connection with the fourth process for determining a market introduction rule.

The priority for each market may be specified giving priority to another market having the next longest value lifetime as shown in FIG. 35 or to a market having the same value lifetime as shown in FIG. 36.

(Fifth Method)

The next markets in which reuse products can be used can be easily determined as shown in FIG. 33(a) for the third method, on the basis of the product age at which reuse products can be reused in each market as well as the period of use of the reuse products in each market.

If the product age at which reuse products can be reused in the last market segment, plus the period of use in this market, does not overlap with the product age at which reuse products can be reused in the next market segment, the reuse between these two market segments is impossible.

The upper and lower limit values of the product age at which reuse products can be reused in the last market (first market) are defined as A1 and a1, respectively. The upper and lower limit values of the product age at which reuse products can be reused in the market in which the reuse products can be used (second market) are defined as A2 and a2, respectively. The period of use in the first market is defined as s. It is assumed that $a1 \leq A1$ and $a2 \leq A2$.

Figure 38:
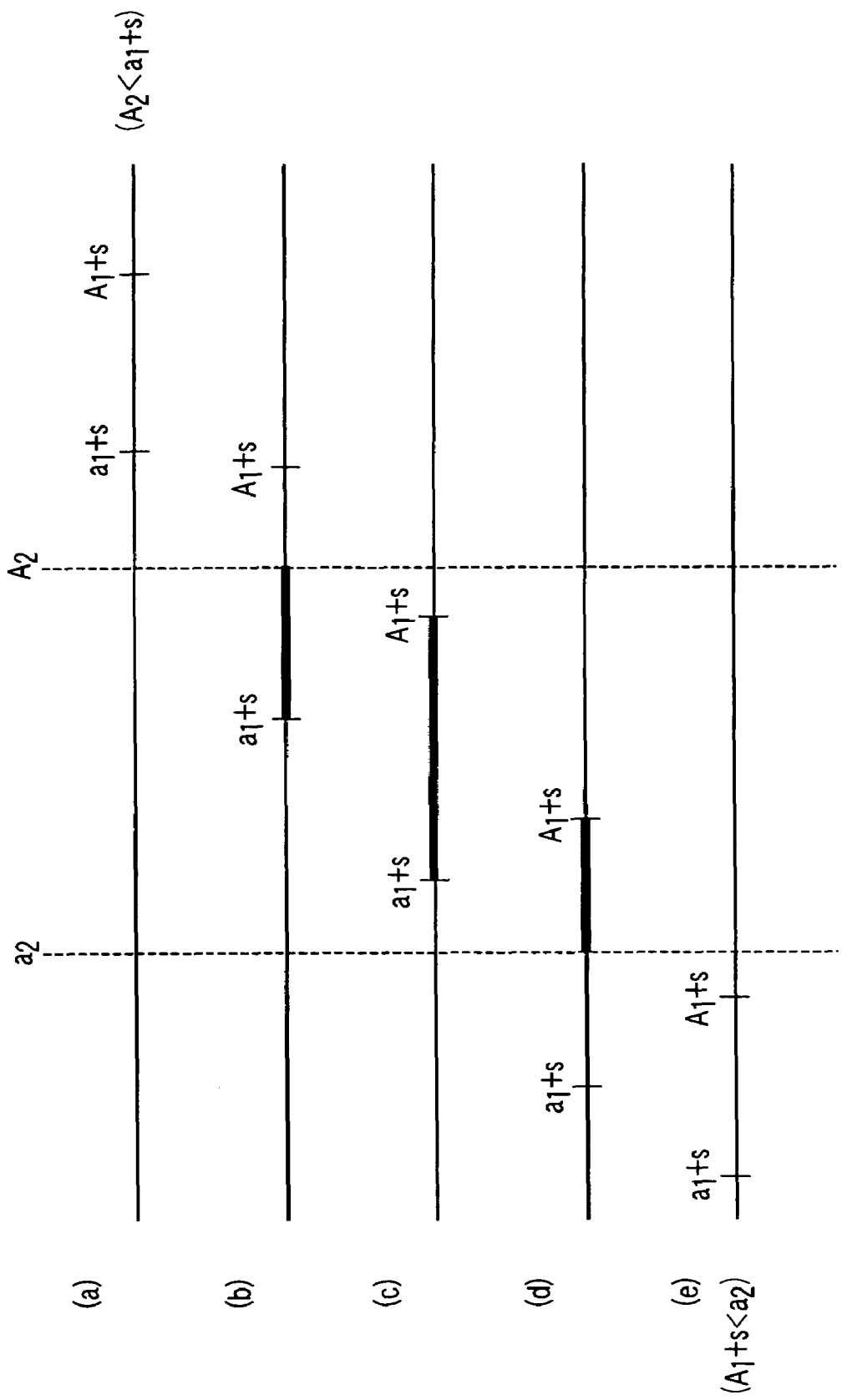
FIG. 38 is a diagram illustrating the fifth method for determining a market introduction rule.

Then, when $A1+s<a2$ (see FIG. 38(e)) or $A2<a1+s$ (see FIG. 38(a)), the reuse between the first and second markets is impossible. In other words, if at least one of the upper and lower limit values of the product age of the reuse products as recovered from the first market (as-recovered age) is between the lower and upper limit values of the product age at which the reuse products can be reused in the second market, then the reuse between the first and second markets is possible.

Figure 37:
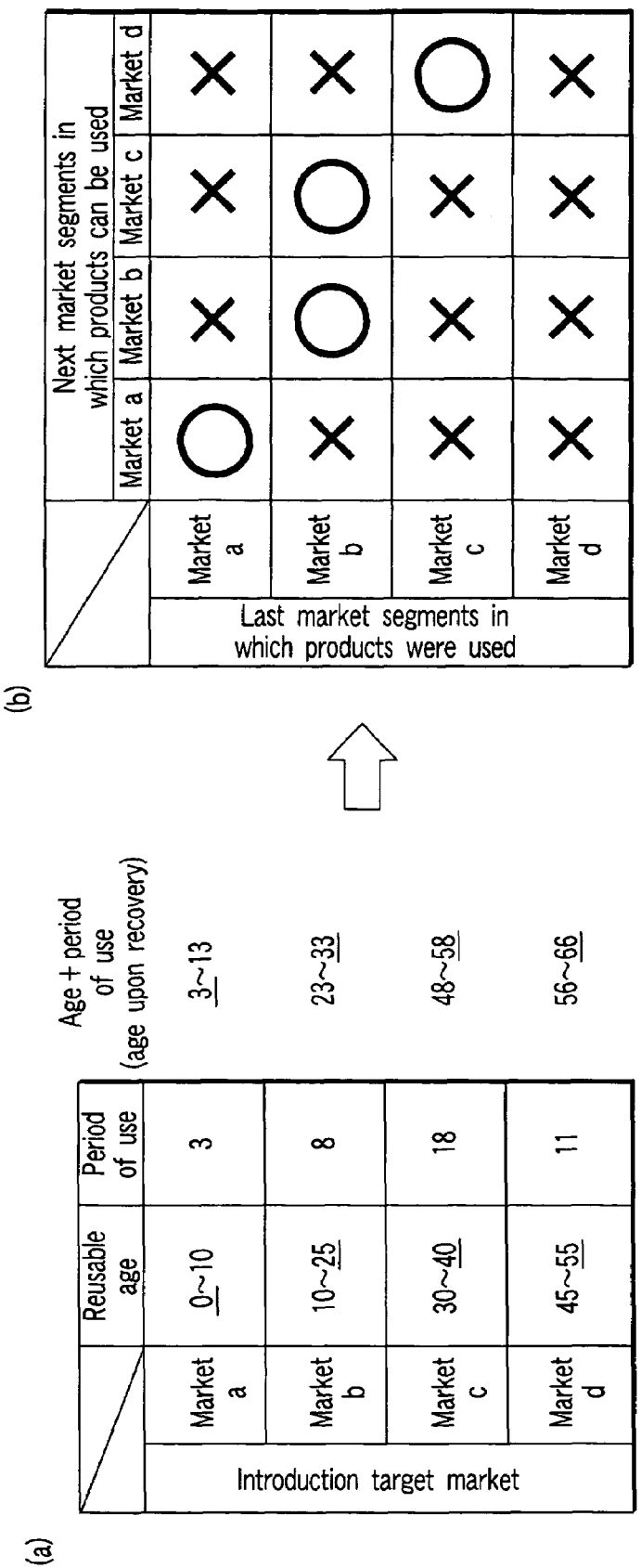
FIG. 37 is a diagram illustrating a fifth method for determining a market introduction rule.

For example, the case will be considered in which the product age of reuse products that can be reused in the market and the period of use in the market are specified as shown in FIG. 37. In this case, for example, the product age at which the reuse products can be reused in the market a is 0 to 10 years. Accordingly, the reuse products recovered from the market a after being used for 3 years have a product age (as-recovered age) of 3 (a1+s=0+3=3) to 13 (A1+s=10+3=13) years. The lower limit value of this product age is larger than that of the product age at which the reuse products can be reused in the market a and is smaller than the upper limit value of this product age (FIG. 38(b)). It is thus possible to determine that the reuse products recovered from the market a can be introduced back into the market a. All the other markets have the relationship shown in FIG. 38(e). Consequently, the reuse products recovered from the market a can be introduced into the other markets.

Further, the product age at which reuse products can be reused in the market b is 15 to 25 years. Accordingly, the reuse products recovered from the market b after being used for 8 years have a product age (as-recovered age) of 23 (a1+s=15+8=23) to 33 (A1+s=25+8=33) years. The lower limit value of this product age is within the range of the product age at which the reuse products can be reused in the market b (FIG. 38(b)). It is thus possible to determine that the reuse products recovered from the market b can be introduced back into the market b. Further, the upper value is within the range of the product age at which the reuse products can be reused in the market c (FIG. 38(d)). It is thus possible to determine that the reuse products recovered from the market b can also be introduced into the market c.

The product age at which reuse products can be reused in the market c is 30 to 40 years. Accordingly, the reuse products recovered from the market c after being used for 18 years have a product age (as-recovered age) of 48 (a1+s=30+18=48) to 58 (A1+s=40+18=58) years. The lower limit value of this product age is within the range of the product age at which the reuse products can be reused in the market d (FIG. 38(b)). It is thus possible to determine that the reuse products recovered from the market c can then be introduced into the market d. All the markets a to c have the relationship shown in FIG. 38(a). Consequently, the reuse products recovered from the market c can be introduced only into the market d.

The product age at which reuse products can be reused in the market d is 45 to 55 years. Accordingly, the reuse products recovered from the market d after being used for 11 years have a product age (as-recovered age) of 56 (a1+s=45+11=56) to 66 (A1+s=55+11=66) years. This product age has the relationship shown in FIG. 38(a) for all the markets. Consequently, the reuse products recovered from the market d cannot be introduced into any markets.

A table such as the one shown in FIG. 37(b) is obtained on the basis of the results of the above determinations; the table indicates markets into which reuse products recovered from a certain market can be introduced. That is, when the user simply specifies, for each market, the product age of reuse products that can be reused in the market and the period of use of the reuse products in the market, the process model setting unit 1c generates information such as that shown in FIG. 31(a).

(Sixth Method)

When the priority for each market in the introduction of reuse products has not been specified, the process model setting unit 1 determines the priorities.

Figure 39:
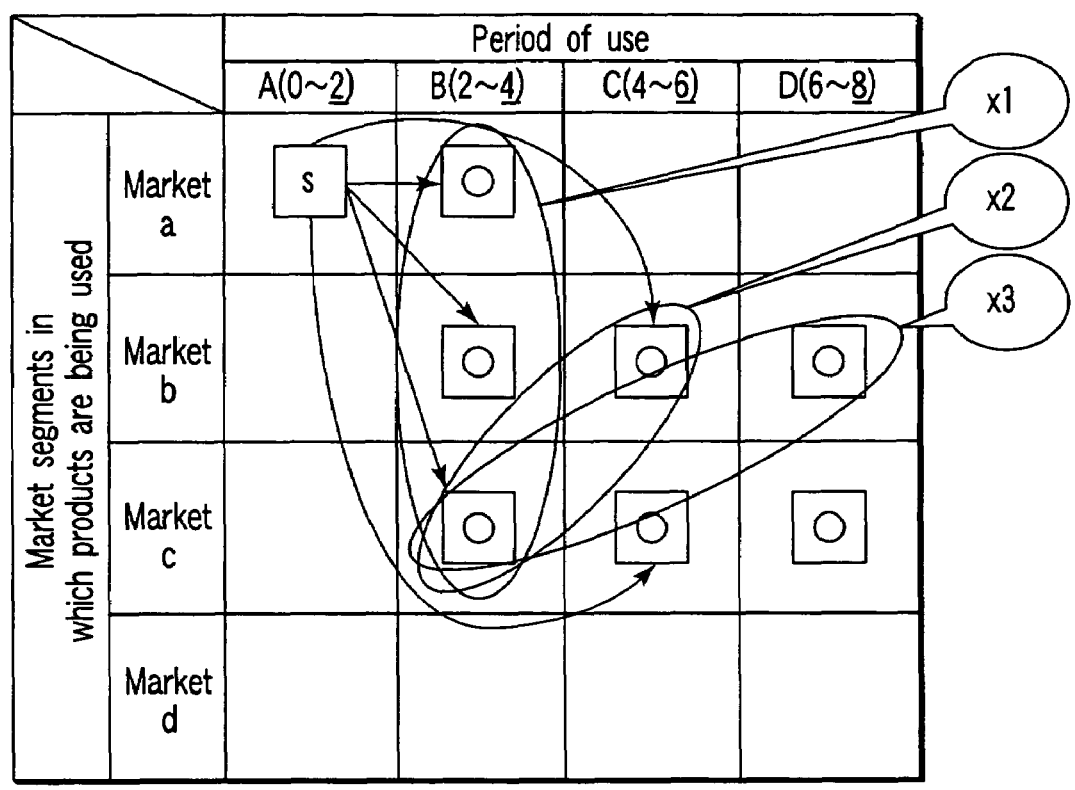
FIG. 39 is a diagram illustrating a sixth method for determining a market introduction rule.

For example, as shown in FIG. 39, (x1) if reuse products recovered from the market a can be reused in a plurality of markets including the markets a, b, and c during the next period B of use, then the cost/profit and environmental load of each of the product reuse process, distribution and transportation process, use process, recovery process, and other processes are calculated for the reuse in each market. Then, the priorities are determined on the basis of the values obtained. At this time, for example, it is assumed that the markets a, b, and c are given decreasing priorities in this order.

Then, (x2) priorities for the next period C of use are similarly determined for the market c with the lowest priority and the market b having a higher priority than the market c. (x3) If the latter still has a higher priority, then priorities for the next period D of use are similarly determined for the markets c and b. This is repeated until a market previously having a lower priority than another market is given a higher priority than the latter.

An introduction order and introduction route used to introduce a product group into a plurality of markets are determined as described above.

Then, with reference to the flowchart shown in FIG. 12, description will be given of process operations of the circulated business evaluation system.

Simulation is executed for each step corresponding to a unit time (in this case, for example, one month). During the unit step, in accordance with the process flow in FIG. 9, calculations are executed on entities (product group) for each process and the entities are moved between processes. Once the process calculations and movement have been finished on all the entities, processing for the next step is started.

First, for example, the calculation condition data in FIG. 2, the background environmental load data in FIG. 3, the background cost and profit data in FIG. 4, and the sale and recovery plan data in FIGS. 5 and 6 are input. Moreover, a market introduction rule such as the one shown in FIG. 11 is determined. Then, a process flow such as the one shown in FIG. 9 is generated (step S1).

An evaluation model is generated, the current time is set at the 0th month (step S1'). Then, processing for each step is started.

During the step processing, a manufacture process in the process flow shown in FIG. 9 is executed (step S2). In this case, an entity newly generated is to be processed. Accordingly, a new entity is generated with reference to the sale and recovery plan data.

The current time is assumed to be the nth month (n is 0, 1, 2, ... 180).

Figure 13:
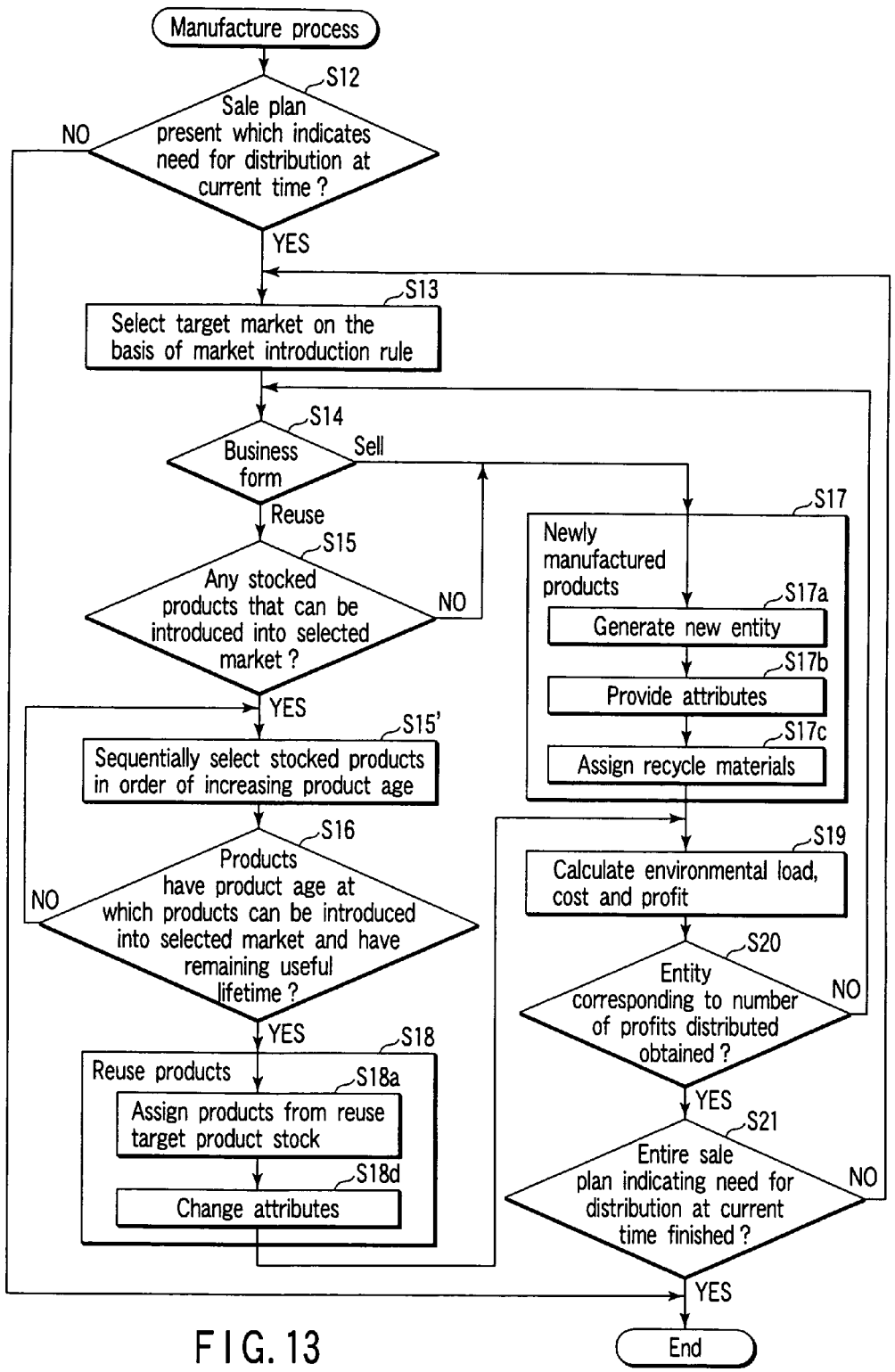
FIG. 13 is a flowchart illustrating a manufacturing process.

FIG. 13 is a flowchart showing a manufacture process. The manufacture process first checks whether or not there is any sale plan involving distribution (shipping), on the basis of the sale and recovery plan data (step S12). In other words, the process checks whether or not there is any plan having a distribution period set at the nth month, which is the current time. When there is at least one such a sale plan, the procedure proceeds to step S13. When there is no sale plan involving a distribution period set at the current time, the manufacture process is ended.

For example, if the current time is the 0th month, a sale plan (first sale plan) is obtained according to which 300 personal computers B will be distributed to the "corporation" segment in the 0th month. Further, if the current time is the 25th month, the following sale plans are obtained: a second sale plan according to which 200 personal computers B will be distributed to the "individual and home" segment in the 25th month and a third sale plan according to which 200 personal computers B will be distributed to the "educational facility" segment in the 25th month.

If a plurality of sale plans is obtained in step S12, then on the basis of the market introduction rule, target segment whose priority is the highest is selected from the market segments in the plurality of sale plans. Then, on the basis of the sale plan for the selected market segment, processing in steps S14 to S19 is executed. If only one sale plan is obtained in step S12, step S13 may be skipped. Then, the processing in steps S14 to S19 is executed.

In step S13, if the current time is, for example, the 0th month, only the first sale plan is obtained in step S12. Thus, the first sale plan is selected. If the current time is the 25th month, the second and third sale plans are obtained in step S12. Then, according to the market introduction rule in FIG. 11, firstly, the second sale plan is selected. The third sale plan is subsequently selected.

The processing in steps S14 to S19 is executed on one entity. If a business form specified in the sale plan selected in step S13 is "sell" (step S14), the procedure proceeds to step S17 to assign newly manufactured products. If the business form is "reuse" (step S14), the procedure proceeds to step S15 to check, in connection with the delivery of reuse products, whether or not there are any stocked products that can be introduced into the market corresponding to the selected sale plan.

Figure 33:
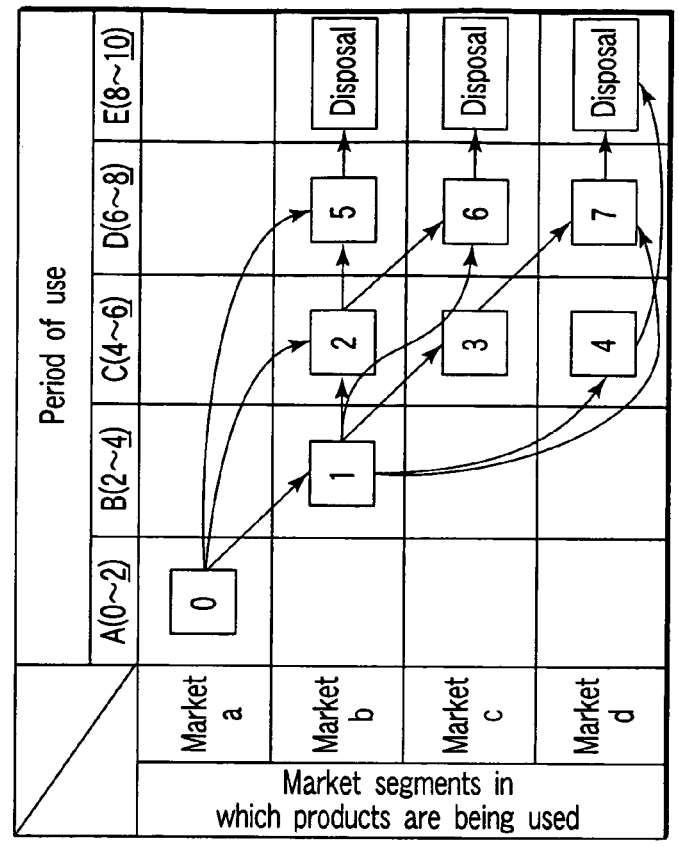
FIG. 33 is a diagram illustrating a third method for determining a market introduction rule.
Figure 34:
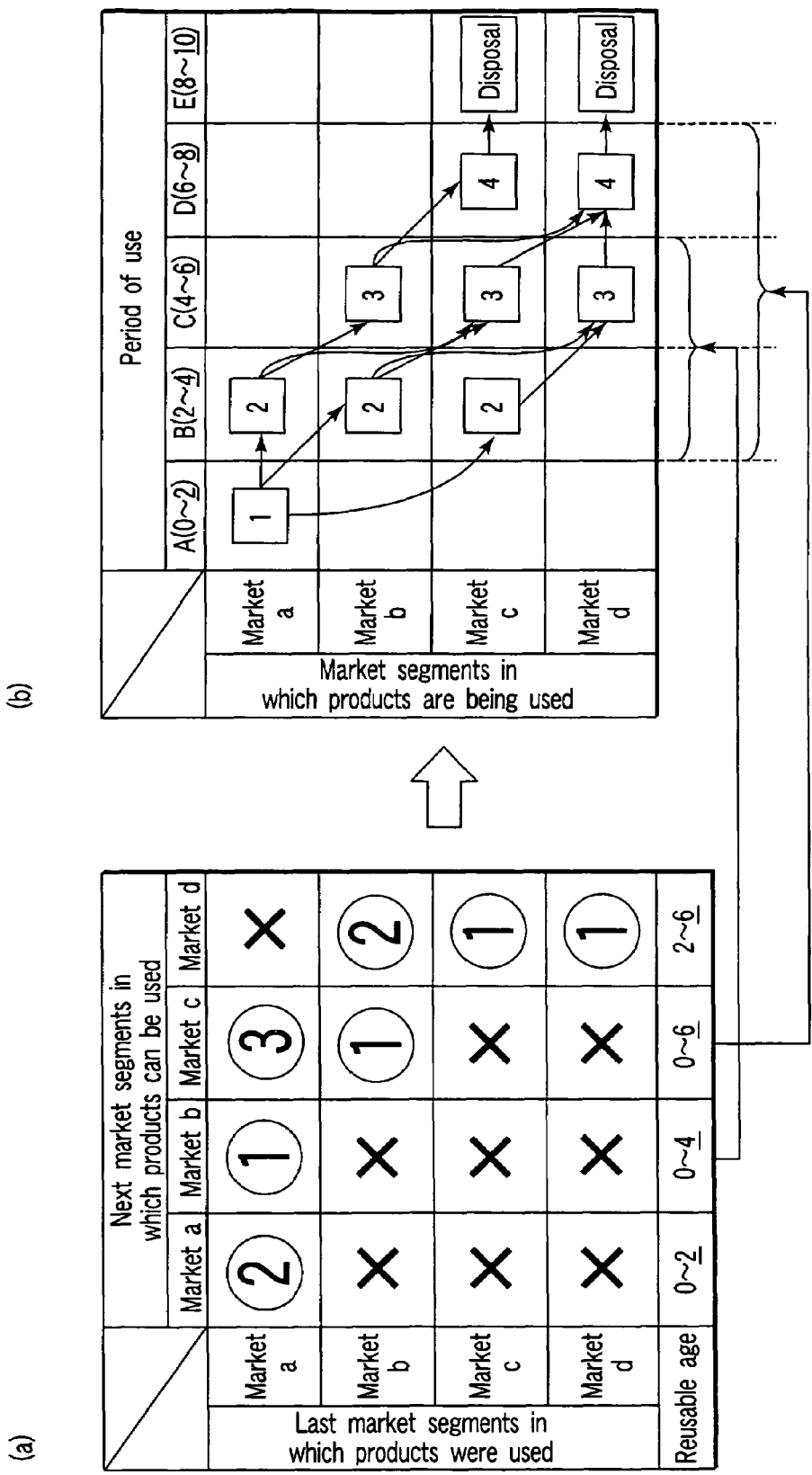
FIG. 34 is a diagram illustrating a fourth method for determining a market introduction rule.

Since a market introduction rule such as the one shown in FIG. 33 or 34 indicates markets into which reuse products recovered from a certain market can be introduced, step S15 selects those of the stocked products which have been recovered from markets from which products can be introduced into the market corresponding to the sale plan selected in step S13. For example, according to the market introduction rule shown in FIG. 34, if the market c is selected as an introduction target, stocked products recovered from the markets a and b after use can be introduced into the market c. Therefore, in step S15', the stocked products are sequentially selected in accordance with the product age. That is, in this example, the stocked products recovered from the market a are selected.

Then, the procedure proceeds to step S16. If the product age of the stocked products selected in step S15' is equal to the product age at which products can be reused in the market selected in step S13, the remaining useful lifetime of the stocked products is compared with the period of use in the market selected in step S13.

Since the use frequency or environment varies with the market segments, determination is made considering how the remaining useful lifetime is consumed in the current target market segment compared to the reference market segment. That is, the remaining useful lifetime of the stocked products is divided by a product use frequency coefficient (see FIG. 6) specified for the current target market segment to determine a substantial remaining useful lifetime.

In step S16, if the product age of the stocked products selected in step S15' is higher or lower than the product age at which products can be reused in the market selected in step S13, the procedure returns to step S15'. If the substantial remaining useful lifetime of the stocked products selected in step S15' is lower than the period of use in the market selected in step S13, the procedure returns to step S15'. Then, stocked products with the next highest product age are selected. The process then proceeds to step S16 again.

In step S16, if the product age of the stocked products selected in step S15' satisfies the product age at which products can be reused in the market selected in step S13 and the substantial remaining useful lifetime of the stocked products is more than or equal to the period of use, then the procedure proceeds to step 18. The stocked products are then assigned to the market selected in step S13.

If newly manufactured products are assigned, then in step S17, a new entity is first generated (step S17*a*). Then, attributes are provided to the entity generated on the basis of the sale plan (step S17*b*). If there are available recycle materials in stock, a particular percentage of the recycle materials are assigned (step S17*c*).

If the current time is the 0th month, the first sale plan is selected from the sale and recovery plan data in FIG. 5. However, according to the first sale plan, 300 products are to be distributed. This corresponds to three calculation product units. Therefore, in this case, steps S14 to S17 are repeated three times to generate three new entities.

FIGS. 14 and 15 show attribute tables for entities generated in the 0th month. FIG. 14 is an attribute table for the entities. FIG. 15 is an attribute table for the components included in each entity.

In step S17*b*, the attributes of the entities and the attributes of the components included in each entity are stored in table form as shown in FIGS. 14 and 15. Such attribute tables as shown in FIGS. 14 and 15 are stored in the data storing unit 11.

As shown in FIG. 14, the following are stored as the attributes of each entity: the market segment to which the entity belongs, the customer and business form corresponding to the market segment, the product distributed to the market segment, the period of use of the product in the market segment, the number of reuses at the time of distribution, the production time of the product, the remaining useful lifetime and product age upon distribution, and the actual number of products included in the entity. The number of products included in the newly generated entity is 100, which is an initial value (calculation product unit). Further, as attributes of each of the components included in each entity, the number of reuses for the component and the production time, remaining useful lifetime of the component, component age, and the like of the component are stored as shown in FIG. 15.

The attribute tables shown in FIGS. 14 and 15 are updated by each process when an entity or a component is newly created or when any attribute is changed as a result of assignment or the like.

Like the remaining useful lifetime of the product, the remaining useful lifetime of the component is a useful lifetime pre-specified for the component when the component has been newly manufactured and not been introduced into any market yet. The remaining useful lifetime of the component introduced into and then recovered from any of the markets can be determined by subtracting the period of use in the market from which the component is recovered, from the remaining useful lifetime of the component.

Like the product age, the component age is the time that has passed since the manufacture of the component (this is represented in months because the calculation step time is one month). That is, when the time (in this case, month) when the component is manufactured is defined as a production time, the component age is obtained by subtracting the production time from the current time.

If the current time is the 0th month, the following are stored in step S17*b*: the number of reuses for each entity is "0", the production time is the "0th month", the remaining useful lifetime is equal to the initial value of the product remaining useful lifetime of the product (for example, in this case, 120 months), and the product age is "0". For each of the components included in each entity, the following are stored: the number of reuses is "0", the production time is "0", the remaining useful lifetime is the equal to the initial value of the remaining useful lifetime of the component, and the component age is "0".

In step S18, some (existing entity) of the stocked products (existing entity) are assigned (step S18*a*). In this case, the product reuse process in FIG. 28, described later, is executed on the assigned entity.

Then, the attributes of the products (existing entity) assigned in step S18*a* are changed (step S18*b*). That is, the attributes of the assigned existing entity are changed to those corresponding to the sale plan for the current target market.

After one entity (newly manufactured products (newly generated entity) or reuse products (existing entity)) has been obtained as described above, costs required for material procurement and processing, profits, and environmental loads are calculated (step S19). Description will be given later of a method for calculating the cost and profit and the environmental load.

The processing in steps S14 to S19 is repeated until entities corresponding to the number of products distributed according to the sale plan selected in step S13 (step S20). Moreover, the processing in steps S13 to S20 is executed on the whole sale plan obtained in step S12 (step S21).

The manufacture process has been described. Referring back to FIG. 12, after the manufacture process has been executed (step S3), a process is executed on existing entities present on the process flow (that is, the entities stored in the attribute table shown in FIG. 14) (step S4).

Figure 18:
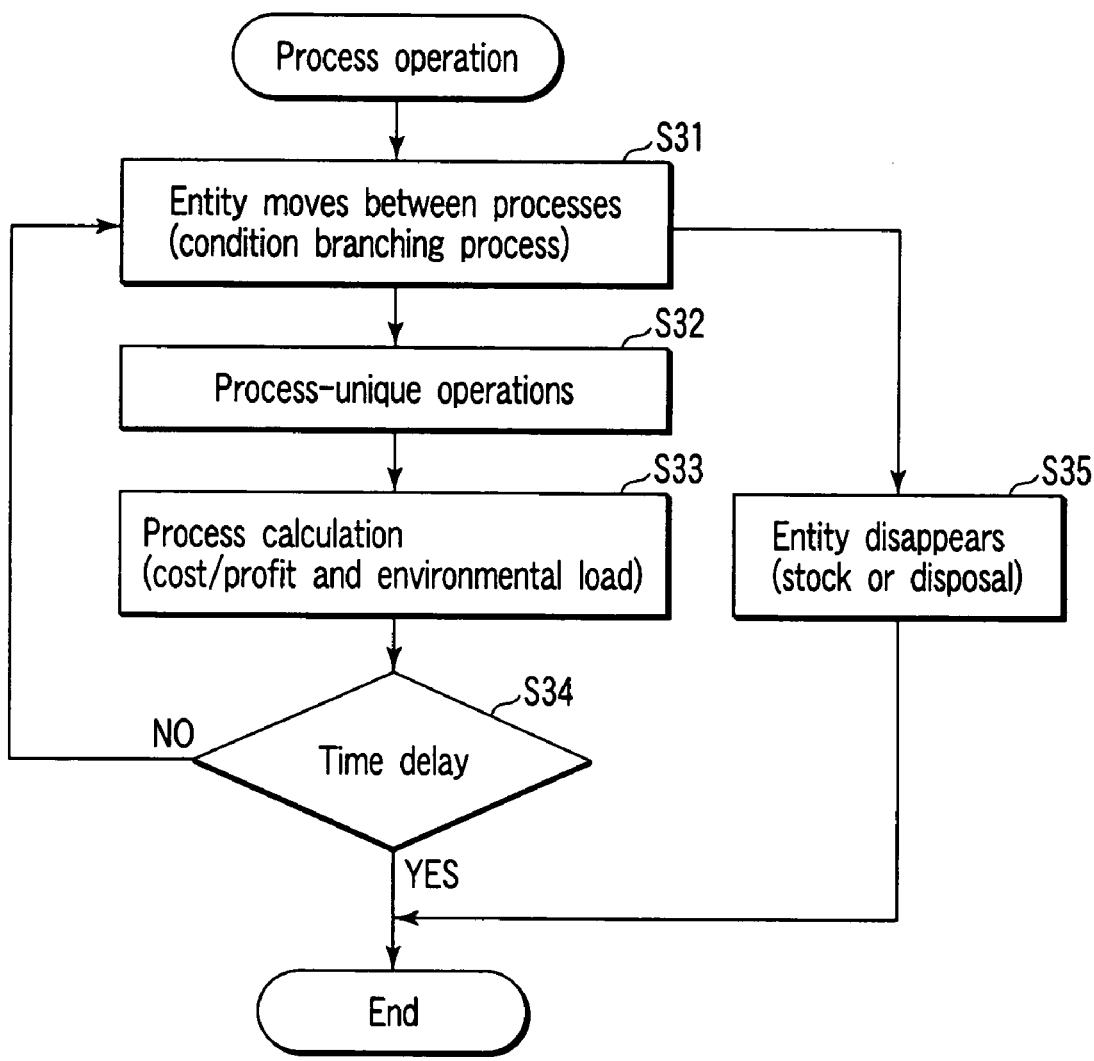
FIG. 18 is a flowchart schematically illustrating each process operation.

FIG. 18 is a flowchart illustrating process operations performed on the existing entity. First, at the current time "nth month", the entity to be processed is moved along the process flow in FIG. 9 (step S31). At the destination entity, operations unique to the process are performed (step S32). Then, the cost and profit and the environmental load are calculated (step S33). When there is a time delay before the procedure transfers to the next process (step S34). If the procedure can transfer to the next process without any time delay, that is, when there is any other process that can be executed at the current time "nth month" (step S34), the procedure returns to step S31. The movement and the process are repeated until the entity disappears as a result of stocking, disposal, or the like (step S35). The above process is executed on all the existing entities on the process flow (step S5 in FIG. 12).

Once the process has been executed on all the existing entities present on the process flow (step S5 in FIG. 12), the procedure proceeds to step S6. Then, apart from the processing of the entity, the environmental load and cost and profit periodically occurring in the business are calculated for each step. For example, for the rental business, a fixed property tax and the like resulting from the owning of the product by a company are calculated.

The process for each calculation step time has been described and is repeated until a specified calculation period (in this case, 180 months) is over (step S7). The processing in steps S2 to S6 is repeated until the step process with the current time (step number) "180th month" is finished. When the current time has not reached the 180th month, the procedure proceeds to step S8 to increment the current time by "1". The procedure then returns to step S2. When the current time has reached the 180th month, the results of the calculations are output (step S9).

Now, description will be given of a method for calculating the environmental load and cost and profit of each process. The environmental load is calculated for each entity using Equation (1).

$$\text{Environmental load } L_{ijkm} = \sum_x (n_x[m]) \times \text{Calculation product unit} \quad (1)$$

i: Step number
j: Stakeholder
k: Process
m: Item m={Energy, CO2, NOx, SOx, BOD, COD, SS, t-P, t-N}
nx: Load of material x The cost and profit are calculated for each entity using Equation (2).

$$\text{Cost and profit } C_{ijkm} = \sum_x (n_x[m]) \times \text{Calculation product unit} \quad (2)$$

i: Step number
j: Stakeholder
k: Process
m: Item m={Cost, Profit}
nx: Price of component x For each of the environmental load and the cost and profit, a total value is calculated for each of the step number, the stakeholder, the process, and the item. For example, the accumulated value for only one process can be determined by calculating the all the totals for that process.

Figure 19:
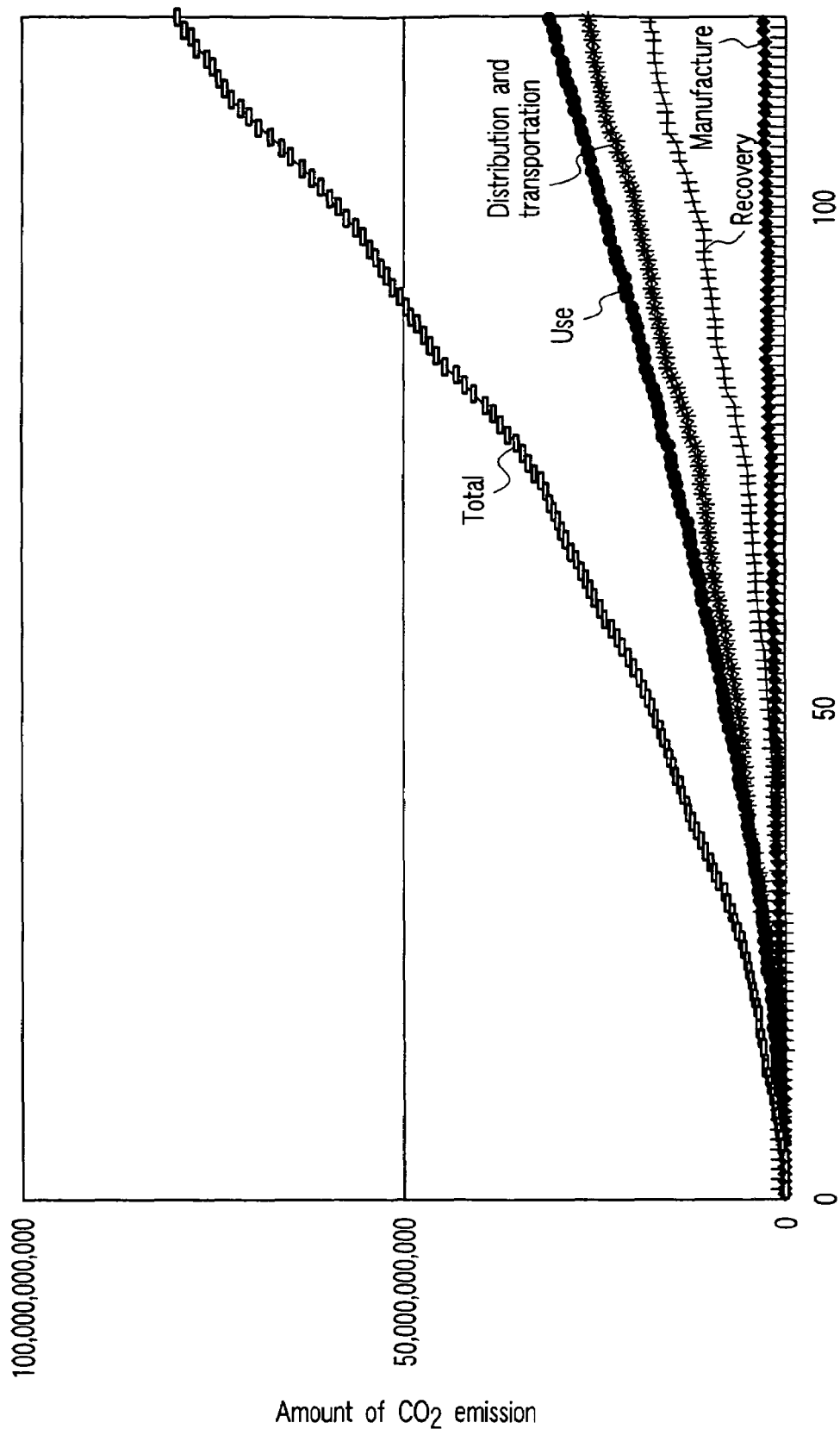
FIG. 19 is a diagram showing an example of display of output results of a result output unit and illustrating the amount of CO2 emission in each process, in a time series manner.

FIGS. 19 to 22 show examples of display of representative output results. FIG. 19 shows the amount of CO2 emission in each process in a time series manner. The axis of abscissa indicates the step number (from 0th month to 180th month). The figure indicates the total of costs for each of the stakeholder, process, and item calculated for each month (step) using Equation (1). In addition to CO2, the amount of emission of an environmental load affecting substance such as NOx or SOx can be displayed.

Figure 20:
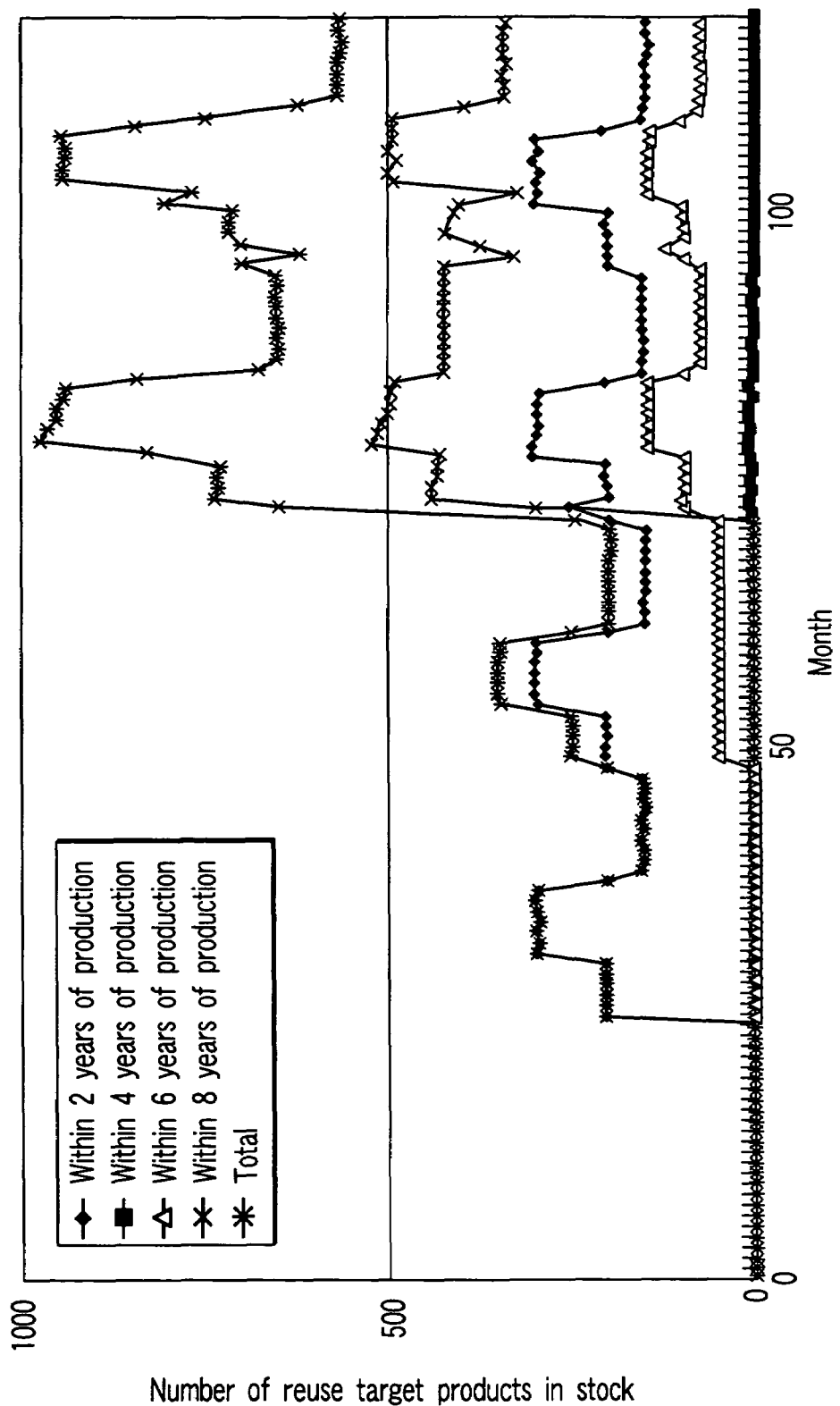
FIG. 20 is a diagram showing an example of display of output results of the result output unit and illustrating the number of reuse products in stock, in a time series manner.

FIG. 20 shows the number of reuse products in stock (number of reuse target products in stock). The axis of abscissa indicates the step number (from 0th month to 180th month). The figure indicates the number of reuse target products in stock for each product age calculated for each month (step). It is also possible to display quantities such as the number of reuse products and newly manufactured products distributed, the number of reuse components, a recycle mass, and a waste mass.

Figure 21:
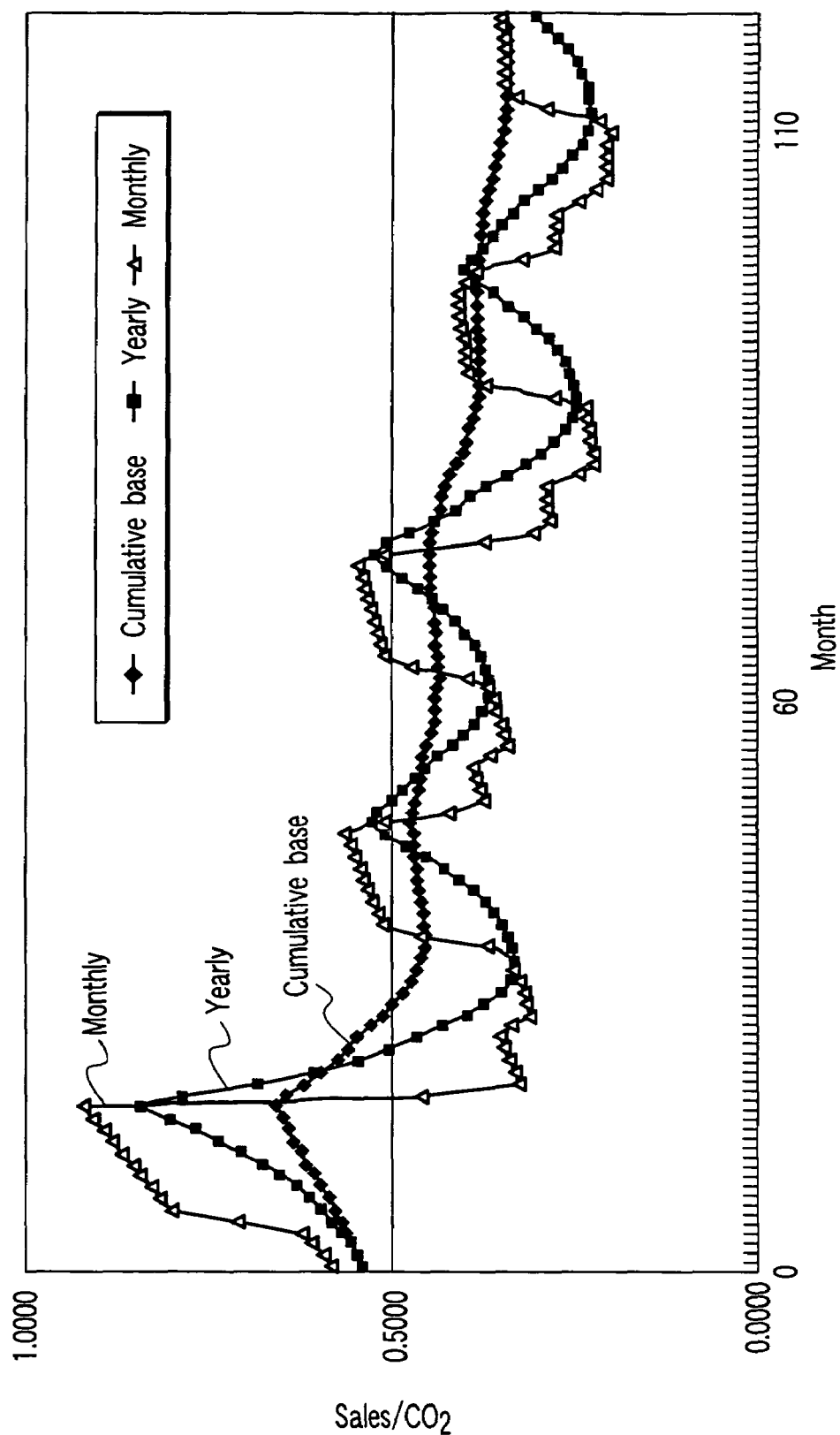
FIG. 21 is a diagram showing an example of display of output results of the result output unit and illustrating environmental efficiency in a time series manner.

FIG. 21 shows the environmental efficiency. It is also possible to display business indices such as a recycle rate, the turnover of inventories, sales, and a sales profit rate.

Figure 22:
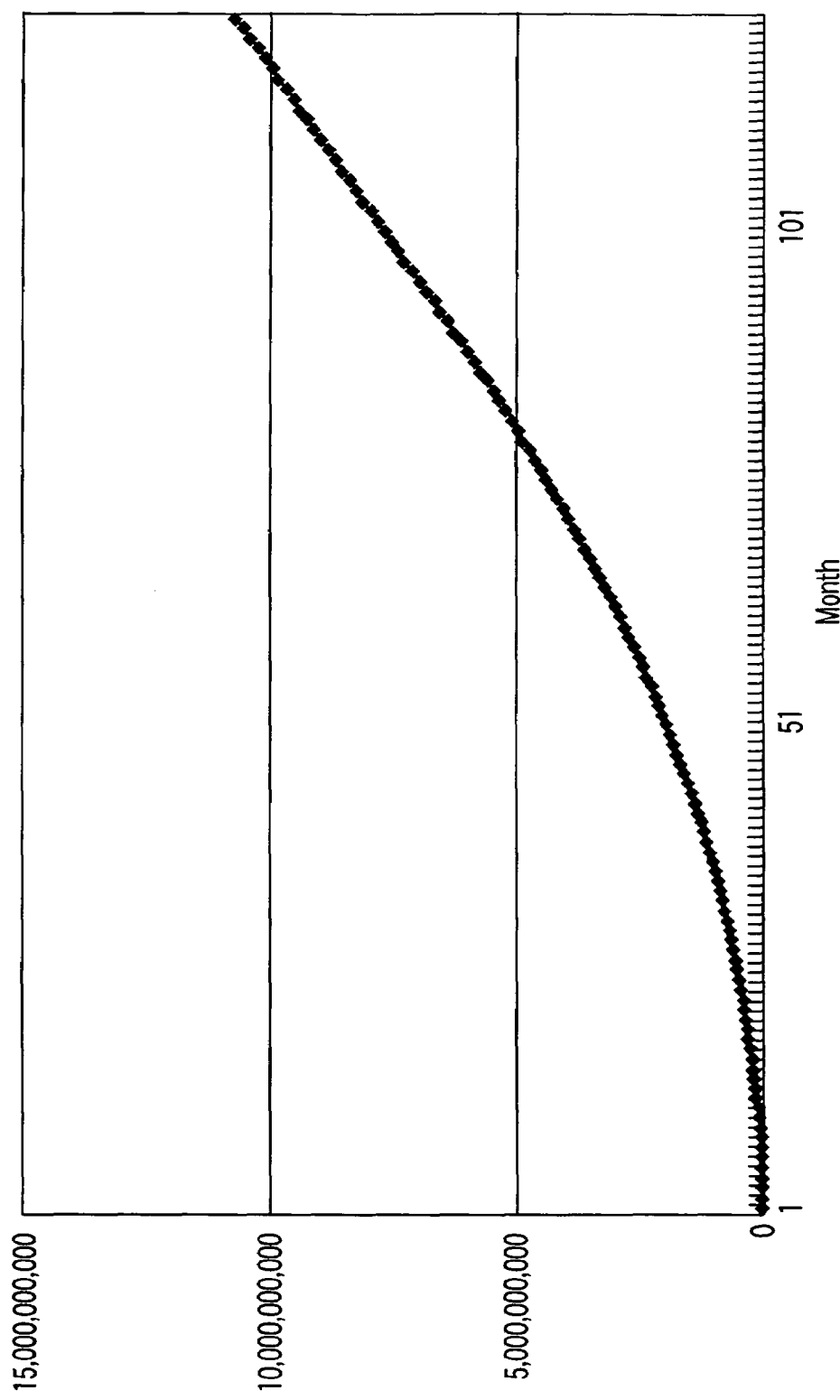
FIG. 22 is a diagram showing an example of display of output results of the result output unit and illustrating sales (profit) in a time series manner.

FIG. 22 shows sales (profit). The axis of abscissa indicates the step number (from 0th month to 180th month). The figure indicates the transition of the accumulated value for profits for each of the stakeholder, process, and item calculated for each month (step) using Equation (2).

Figure 23:
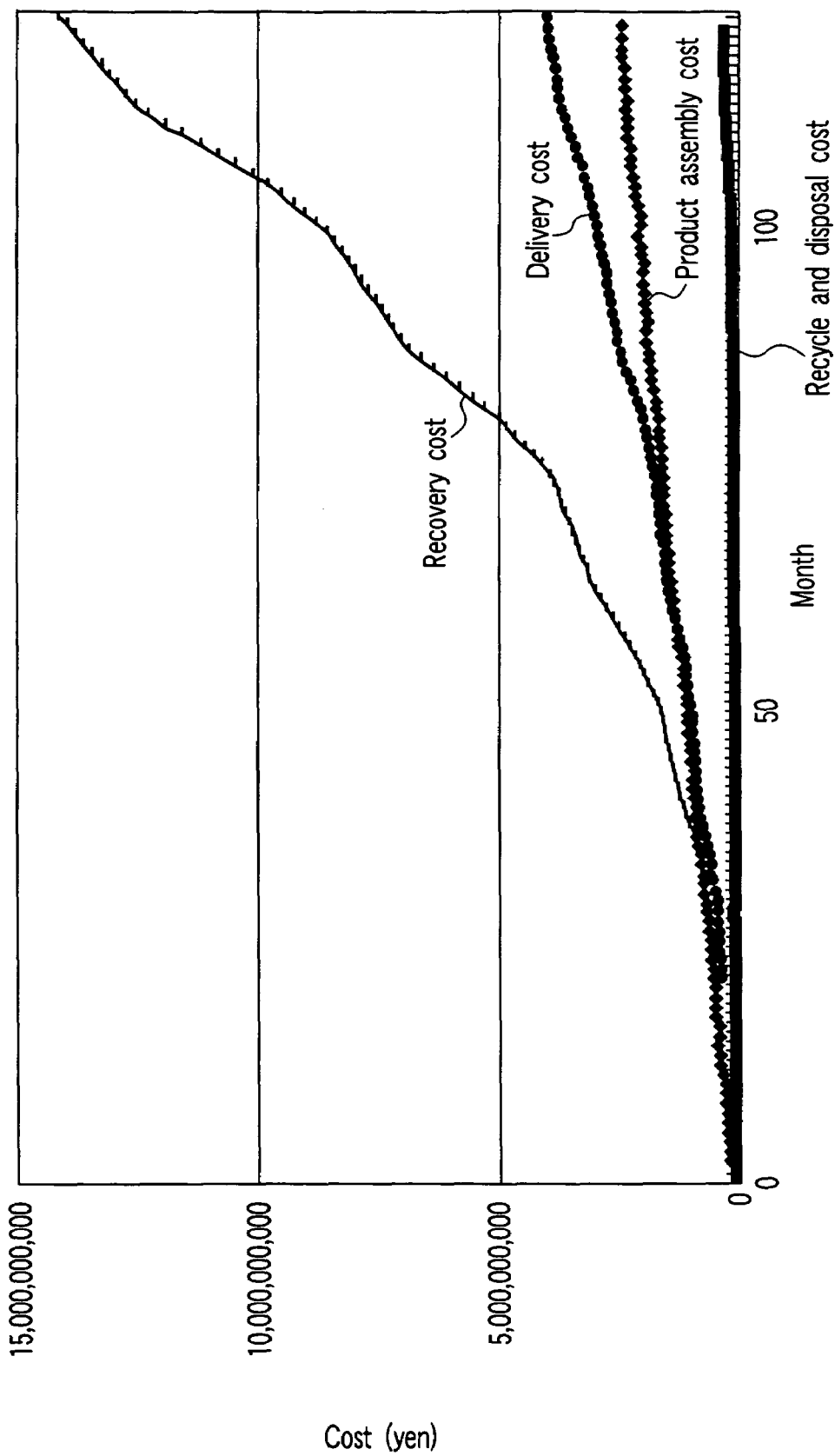
FIG. 23 is a diagram showing an example of display of output results of the result output unit and illustrating costs in a time series manner.

FIG. 23 shows costs. The axis of abscissa indicates the step number (from 0th month to 180th month). The figure indicates the transition of the accumulated value for costs for each of the stakeholder and item calculated for each month (step) and each process (in this case, for example, the distribution and transportation process, recovery process, manufacture process, and recycle and disposal process) using Equation (2).

Now, description will be given of the process procedure of each process included in the process flow shown in FIG. 9. The manufacture process, included in the process flow in FIG. 9, has already been described (see FIG. 13). Here, description will be given of the testing process, distribution and transportation process, use process, recovery process, disassembly process, product reuse process, component reuse process, and recycle process, all of which are included in the process flow in FIG. 9.

Figure 24:
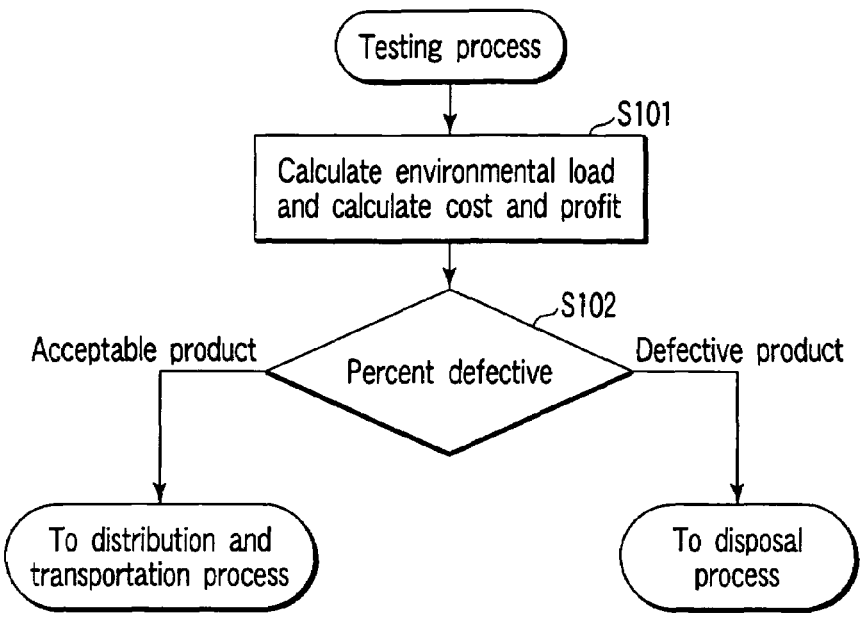
FIG. 24 is a flowchart illustrating a testing process.

FIG. 24 is a flowchart showing the process procedure of the product testing process. The testing process is executed on entities transferred from the manufacture process in step S4, shown in FIG. 12. The testing process is executed on, for example, an entity newly generated at the current time "nth month" and an entity of assigned reuse products within the nth month. First, for the entities to be processed, the environmental load and cost and profit resulting from the testing process are calculated using Equations (1) and (2) (step S101). The testing process sets the incidence of detects detected as a result of product tests, that is, a percent defective. Thus, the products are apportioned in accordance with the percent defective. An apportioning method comprises (if for example, one entity includes, for example, one product) determining the whole entity to be acceptable or defective or dividing the whole entity into two entities including an acceptable entity and a defective entity, in accordance with the percent defective. The entity determined to be acceptable is transferred to the distribution and transportation process. The entity determined to be defective is transferred to the disposal process. If one entity is divided into two entities, the attribute (the number of products included in the entity) of the source entity is updated. Further, the attributes of the entities resulting from the division are newly registered in the attribute table.

Figure 12:
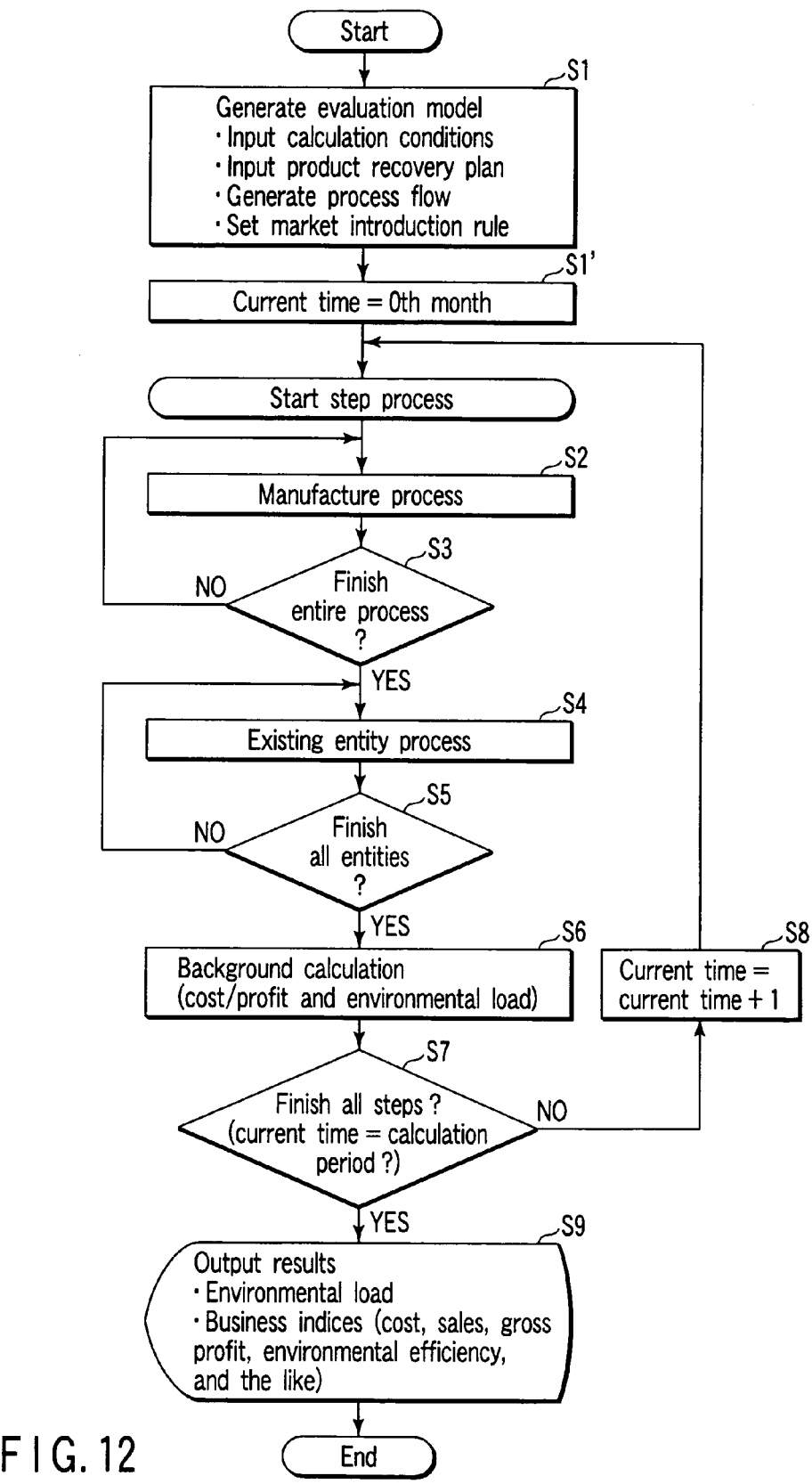
FIG. 12 is a flowchart illustrating process operations of a circulated business evaluation system.

In step S4 in FIG. 12, the distribution and transportation process is executed, within the current time "nth month", on, for example, each entity determined to be acceptable through the testing process in the "nth month". This process calculates the environmental load and cost and profit during product distribution using Equations (1) and (2). The load and cost are calculated by not only directly specifying normal indirect materials used and costs and profits but also specifying transportation means and amount.

Figure 25:
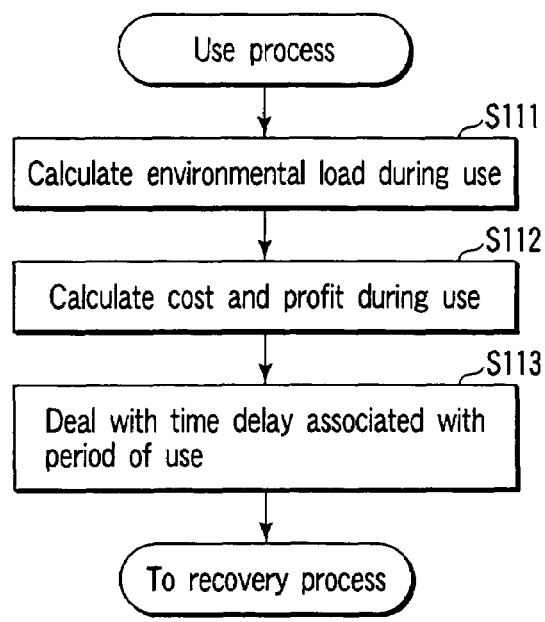
FIG. 25 is a flowchart illustrating a use process.

FIG. 25 is a flowchart showing the process procedure of the use process. In step S4 in FIG. 12, the use process is executed on each entity remaining in the distribution (introduction) target market segment as a result of the distribution and transportation process. In the use process, for all the entities remaining in each market segment to which the entities have been distributed, the environmental load and cost and profit occurring when the user uses the product are calculated for each month corresponding to the calculation step time, using Equations (1) and (2) (steps S111 and S112). In S8 in FIG. 12, every time the current time increments by one, the environmental load and cost and profit occurring during one month are calculated for each of the entities remaining in each market segment until the period of use specified for the market segment is reached (step S113). Once the period of use during which each of the entities remaining in each market is used is over, the entity is transferred to the recovery process.

Figure 26:
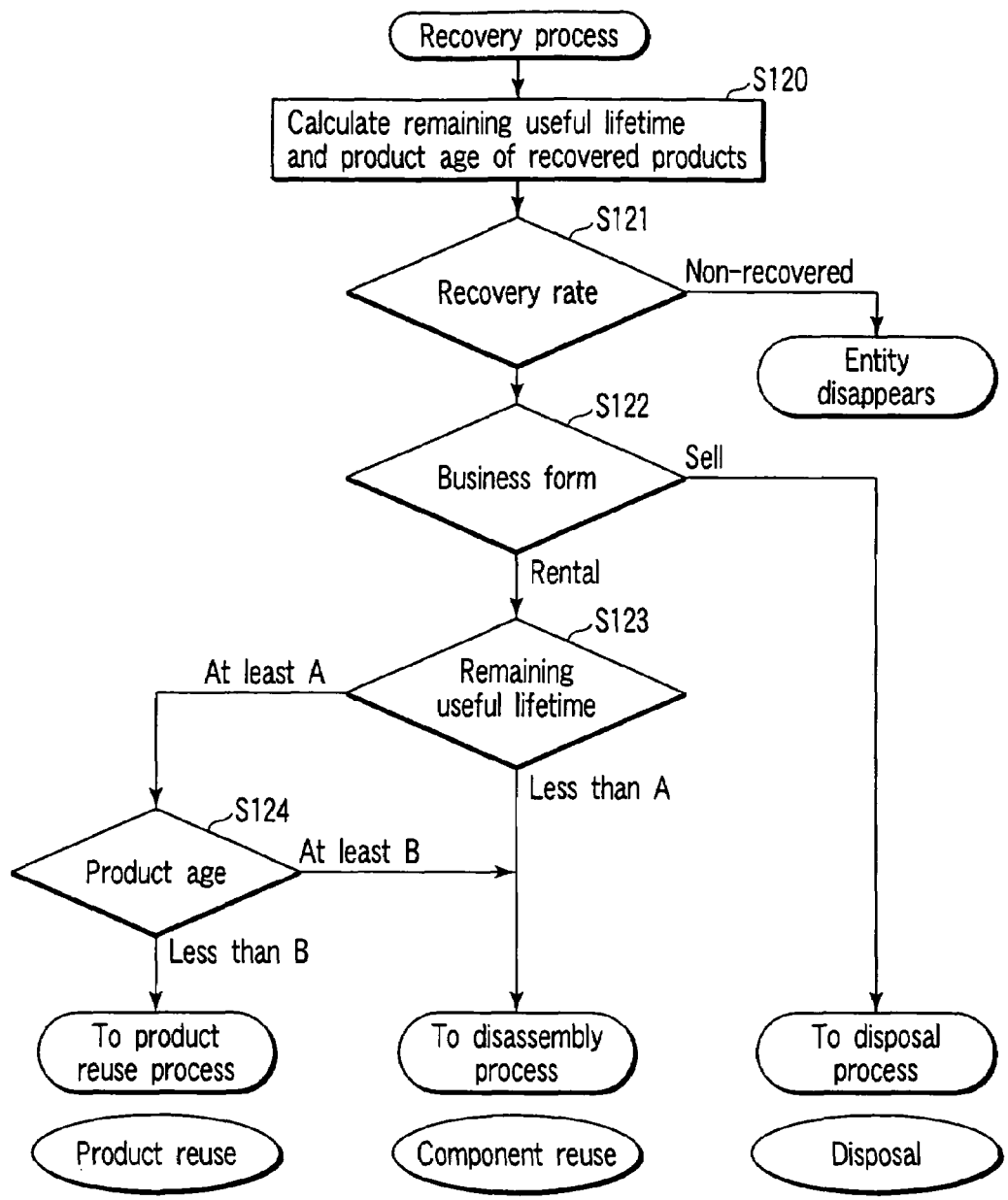
FIG. 26 is a flowchart illustrating a recovery process.

FIG. 26 is a flowchart showing the process procedure of the recovery process. In step S4 in FIG. 12, the recovery process is executed on entities transferred from the use process after the period of use in the introduction target market segment has passed. The recovery process first calculates the remaining useful lifetimes and product ages of the recovered entities (step S120). The results of the calculations are recorded in the "remaining useful lifetime of product" and "product age" sections corresponding to the entities, on the attributed table shown in FIG. 14.

Then, each of the entities is apportioned to one of the three processes under four conditions. First, on the basis of a prespecified recovery rate, the entities are divided into recovered products and non-recovered products (step S121). The entities corresponding to the non-recovered products disappear.

The recovered products are divided into groups in accordance with the business forms of the markets into which the recovered products have been introduced (step S122). Products used in sellout businesses are apportioned to the disposal process similarly to the non-recovered products. Products used (recovered) in rental lease businesses are divided into groups in accordance with the remaining useful lifetime (step S123). The remaining useful lifetime of the recovered products is compared with the value (denoted at "A" in FIG. 26) of the shortest "period of use" in sale plans with the "reuse" business form. If the remaining useful time of the recovered products is shorter than the shortest period of use (for example, 24 months), the products are apportioned to the disassembly process so that the components included in the products are to be reused, that is, these products are designated as component reuse target products.

For the entity whose remaining useful lifetime is determined to be at least "A" in step S123, the product age of the entity is compared with the highest (denoted at "B" in FIG. 26) of reusable product ages in all the markets according to the market introduction rule, in step S124. If the product age of the entity is at least "B", the entity is apportioned to the disassembly process because there is no market into which the entity is to be introduced. If the product age of the entity is lower than "B", the entity is apportioned to the product reuse process so that it can be reused and introduced in another market segment.

The method for apportioning one entity in accordance with the recovery rate in step S121 comprises (if for example, one entity includes, for example, one product) determining the whole entity to be acceptable or defective or dividing the entity into two entities including a recovered entity and a non-recovered entity, in accordance with the recovery rate. If one entity is divided into two entities, the attribute (the number of products included in the entity) of the source entity is updated. Further, the attributes of the entities resulting from the division are newly registered in the attribute table.

Figure 27:
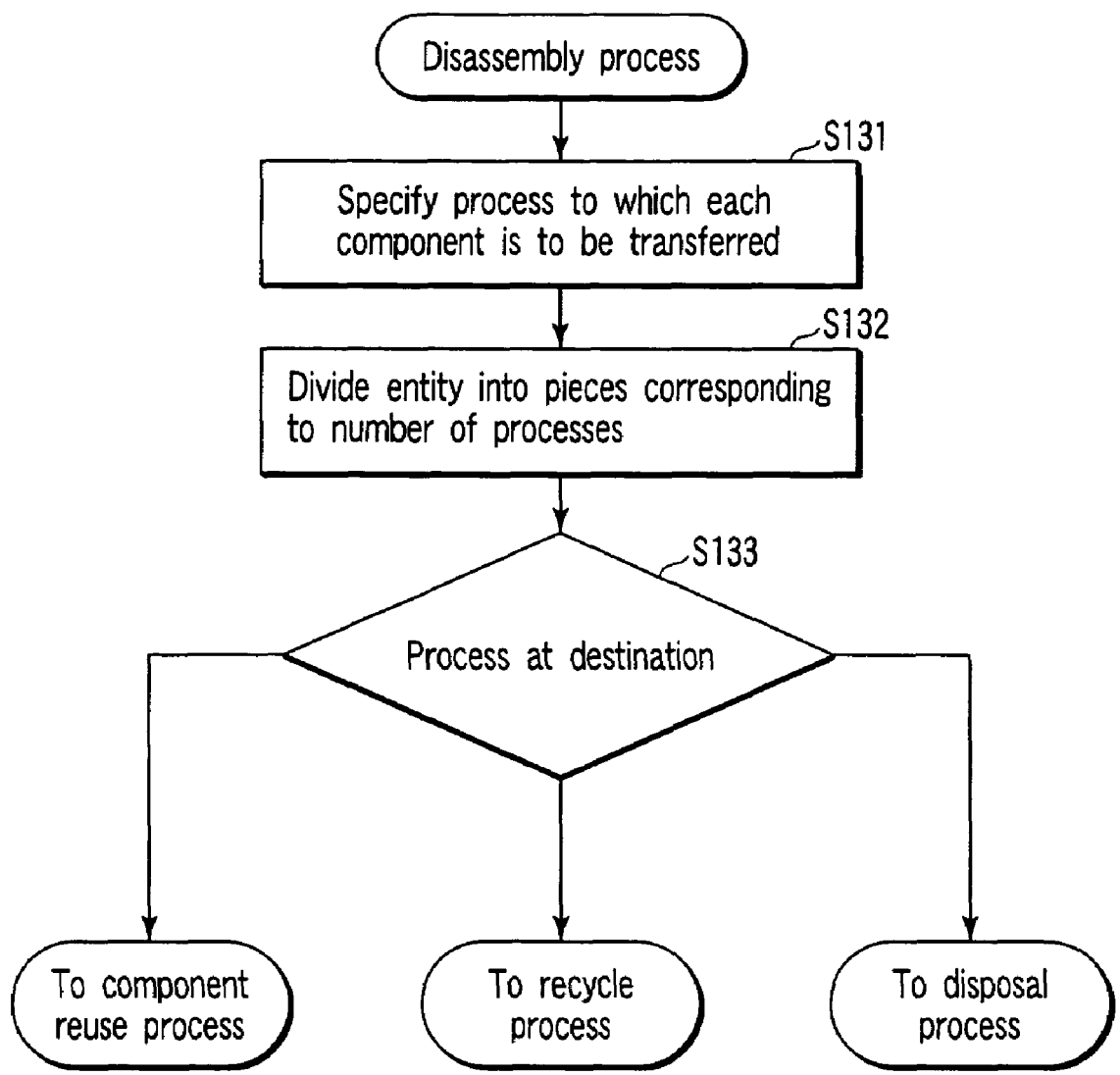
FIG. 27 is a flowchart illustrating a disassembly process.

FIG. 27 is a flowchart showing the process procedure of the disassembly process. In step S4 in FIG. 12, the disassembly process is executed on entities transferred from the recovery process and the product reuse process. The disassembly process disassembles each product into component and transfers the components to different processes (in this case, the component reuse process, the recycle process, and the disposal process). First, the process is determined to which each component is to be moved (step S131). One entity is divided into a number of processes determined in step S131 (step S132). Then, each entity resulting from the division is transferred to one of the three processes (step S133).

Figure 28:
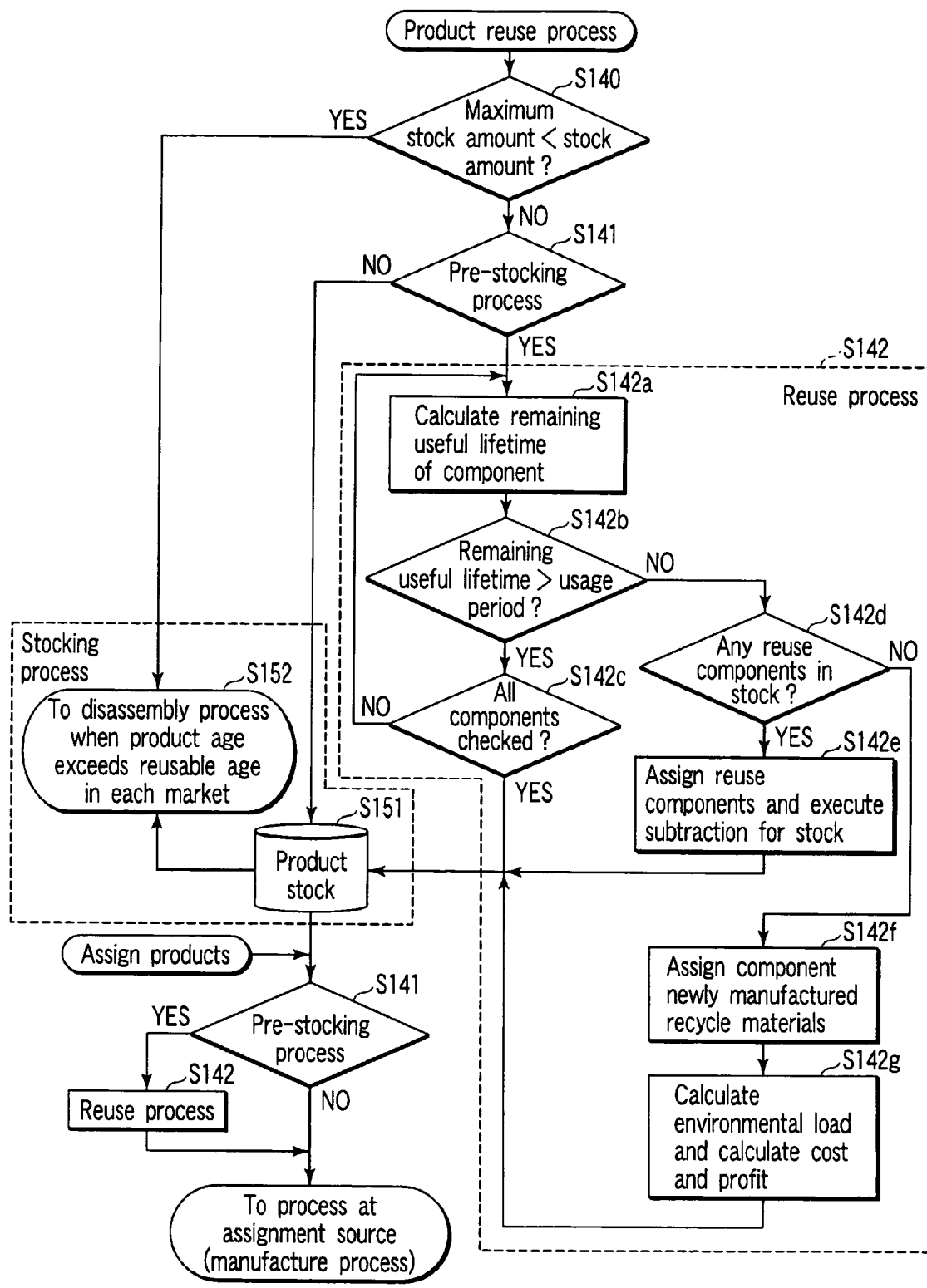
FIG. 28 is a flowchart illustrating a manufacture reuse process.

FIG. 28 is a flowchart showing the process procedure of the product reuse process. In step S4 in FIG. 12, the product reuse process is executed on entities transferred from the recovery process. FIG. 28 includes the stocking process (steps S140, S151, and S152).

First, when the current stock amount exceeds a pre-specified maximum value, the procedure proceeds to step S152 to dispose of the inventory exceeding the maximum stock amount.

In step S4 in FIG. 12, the product reuse process immediately executes a reuse process on entities transferred from the recovery process and then stock them in reusable form (prestocking process). Alternatively, the product reuse process stocks the entities transferred from the recovery process and then execute a reuse process when the entities are assigned (post-assignment process) (step S141).

In either case, the reuse process in step S142 calculates the environmental load and cost and profit occurring when reuse components or new components replace components of the entities transferred from the recovery process which have insufficient remaining useful lifetimes. Specifically, the entities subjected to the reuse process in step S142 are those assigned in step S18 of the manufacture process in FIG. 13. The environmental load and cost and profit calculated in step S142 are those occurring when the reuse products are assigned in step S18 of the manufacture process in FIG. 13.

The reuse process in step S142 first calculates the remaining useful lifetime of each of the components included in an entity to be processed (step S142a). With reference to the attribute table (see FIG. 15) of the components included in the entity, the remaining useful lifetime of each of the components included in the entity is compared with the period of use in the market segment (sale plan) into which the entity is to be introduced during the manufacture process (step S142c). In this case, as in the case of step S16 in FIG. 13, the remaining useful lifetime is divided by a component use frequency coefficient (see FIG. 6) specified for the target market segment, to determine a substantial remaining useful lifetime. Then, the substantial remaining useful lifetime of this stocked product is compared with the period of use in the target market segment. If the substantial remaining useful lifetime of the component is shorter than the period of use (step S142b), the component must be replaced with a reuse component. Thus, if any stocked component has a substantial remaining useful lifetime equal to or longer than the period of use (step S142d), this stocked component is assigned to replacement (step S142e).

The attributes (see FIG. 15) of the component replaced with a reuse component (stocked component) or a newly manufactured component are changed to those of the stocked or newly manufactured component, the component being included in those of the entity to be processed.

If none of the stocked components have a substantial remaining useful lifetime equal to or longer than the period of use, a new component is manufactured (step S142f). Subsequently, the environmental load and cost and profit in steps S142e and S142f are calculated using Equations (1) and (2) (step S142f). The environmental load and cost and profit are calculated in terms of components.

The stocking process allows entities transferred from the use process to remain until they are assigned to the manufacture process or the like. The actual number of products present in the stocking process is the number of products in stock.

The stocking process updates the product ages of entities present in the stocking process while they remain. If any entity has such a high product age that it cannot be introduced into any of the plurality of market segments, the entity whose product age exceeds the reusable product ages in all the segments is preferentially transferred to the disassembly process (steps S151 and S152). In other words, in one of the plurality of market segments which has the longest value lifetime, such entities as have product ages equal to or lower than (or just lower than) the value lifetime of the one of the markets even after use for a pre-specified period in the one of the markets are left as stocked products.

Further, if the stock amount exceeds the maximum value, the entities are sequentially transferred to the disassembly process in order of decreasing product age until the stock amount is at most the maximum value.

Figure 29:
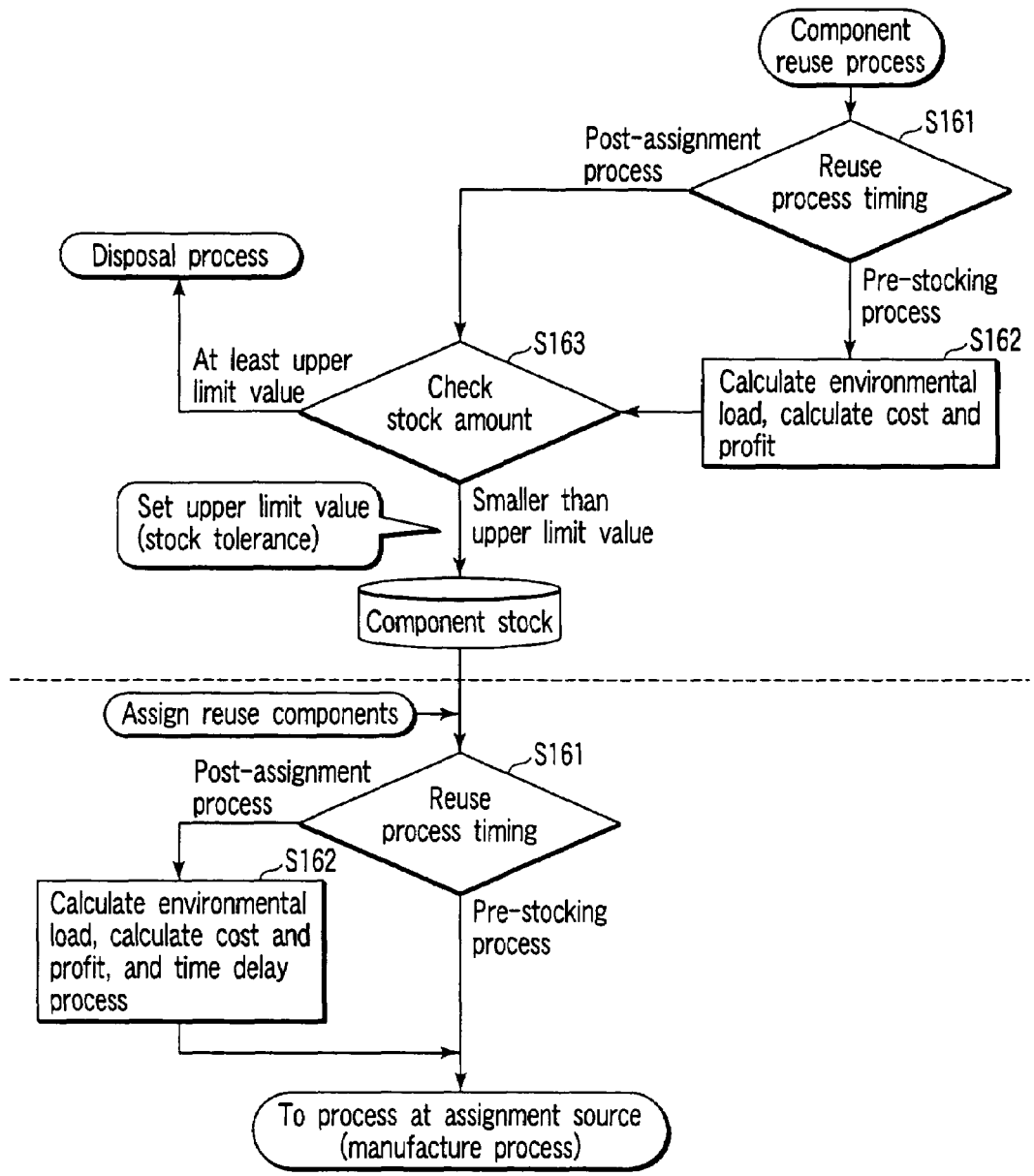
FIG. 29 is a flowchart illustrating a component use process.

FIG. 29 is a flowchart showing the process procedure of a component reuse process. In step S4 in FIG. 12, the component reuse process is executed on entities transferred from the disassembly process. The component reuse process shown in FIG. 29 includes a component stocking process.

In step S4 in FIG. 12, the component reuse process immediately calculates the environmental load and cost and profit of the entities transferred from the disassembly process (step S162) and then stock them in reusable form (pre-stocking process). Alternatively, the component reuse process stocks the entities transferred from the recovery process, as stocked components, and then calculates the environmental load and cost and profit when the entities are assigned (post-assignment process) (step S161).

The component reuse process allows entities transferred from the disassembly process to remain until they are assigned to the product reuse process. The product ages of the remaining entities are updated while they are remaining. When the number of components in stock is at least a pre-specified upper limit value (stock tolerance) for the stock amount, the entities are sequentially transferred to the disposal process in order of increasing remaining useful lifetime of component (step S163). For stocked components (entity) the number of which is at most the stock tolerance, the environmental load and cost and profit are calculated using Equations (1) and (2) when the components are assigned to the product reuse process or when they are transferred from the disassembly process (step S162).

Figure 30:
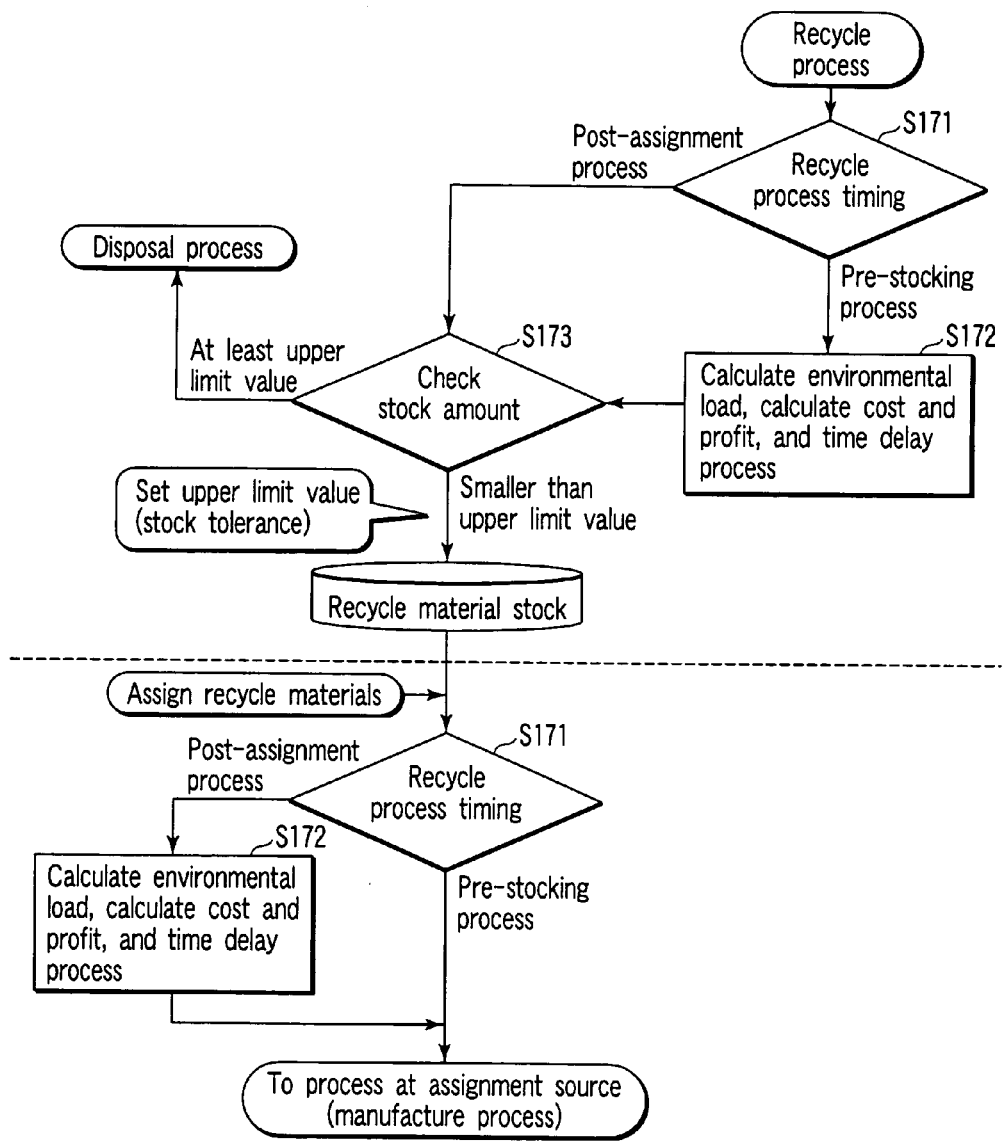
FIG. 30 is a flowchart illustrating a recycle process.

FIG. 30 is a flowchart showing the process procedure of the recycle process. In step S4 in FIG. 12, the recycle process is executed on entities transferred from the disassembly process. The recycle process shown in FIG. 30 includes a material stocking process.

In step S4 in FIG. 12, the recycle process immediately calculates the environmental load and cost and profit of the entities transferred from the disassembly process (step S172) and then stock them so that they can be utilized as recycle materials (pre-stocking process). Alternatively, the recycle process stocks the entities transferred from the recovery process, and then calculates the environmental load and cost and profit when the entities are assigned (post-assignment process) (step S171).

The recycle process allows the entities transferred from the disassembly process to remain until they are assigned to the manufacture process or the component reuse process. When the amount of recycle materials in stock is at least a pre-specified upper limit value (stock tolerance) for the stock amount, surplus materials are transferred to the disposal process (step S173). For stocked recycle materials (entity) the amount of which is at most the stock tolerance, the environmental load and cost and profit are calculated using Equations (1) and (2) when the materials are assigned or when they are transferred from the disassembly process (step S172).

Now, a specific description will be given of process operations of the simulation executing unit 2 on the basis of the sale and recovery plan shown in FIG. 5.

For example, when the current time is the 0th month, the manufacture process generates three entities, "entity 1" to "entity 3", as shown in FIG. 15, on the basis of a first sale plan according to which 300 personal computers B are distributed to the "corporation" segment in the 0th month.

Subsequently, when the current time is the 24th month, the recovery process recovers the 300 personal computers B delivered to the "corporation" segment. That is, as shown in FIG. 26, the recovery process recovers the "entity 1" to "entity 3" to calculate the remaining useful lifetime and product age of each of the entities (step S120). Specifically, the remaining useful lifetime of the "entity 1" to "entity 3" is obtained by subtracting the period of use in the "corporation" segment "24" from the original remaining useful lifetime "120"; the remaining useful lifetime is thus "96". The attribute table is updated on the basis of the results of these calculations (see FIG. 16).

All of the "entity 1" to "entity 3" are recovered (step S121). Since this is a rental business (step S122), the procedure proceeds to step S123. The current remaining useful lifetime of the "entity 1" to "entity 3" is "96". Thus, the value is more than A (=24 months).

Further, the upper limit value of the reusable product age in each market is found by subtracting the period of use in the market from the value lifetime pre-specified for the market. Accordingly, for the "educational facility segment", included in the plurality of market segments, the product value lifetime is 72 months and the period of use is 24 months, so that the reusable product age is 48 months. This reusable product age is highest among the three market segments. The product age "24" of the "entity 1" to "entity 3" is less than B=48. Therefore, the "entity 1" to "entity 3" are transferred to the product reuse process.

Subsequently, when the current time is the 25th month, the manufacture process obtains a second plan according to which 200 personal computers B are distributed to the "individual and home" segment in the 25th month and a third plan according to which 200 personal computers B are distributed to the "educational facility" segment in the 25th month. In this case, the second sale plan is first selected according to the market introduction rule shown in FIG. 11 (step S13 in FIG. 13). The second sale plan relates a rental business (step S14). At present, the products called the "entity 1" to "entity 3" are in stock; the "entity 1" to "entity 3" have been recovered from the "corporation" segment and can be introduced into the "individual and home" segment (step S15). For these products in stock, the product age is "24" and the "substantial" remaining useful lifetime [current remaining useful lifetime "96"/product use frequency coefficient of "individual and home" segment "0.2"] is more than the period of use "24 months" according to the second sale plan (step S16). Accordingly, the "entity 1" is first assigned (step S18). The attribute data on the "entity 1" are updated. Then, the "entity 2" is assigned (steps S14 to S18). As a result, the attribute data on the "entity 2" are updated. This provides an entity corresponding to the number of products distributed according to the second sale plan.

Then, a third sale plan is selected in step S13. The third sale plan relates to a rental business (step S14). At present, the products called the "entity 3" are in stock (step S15). For these products in stock, the product age is "24" and the "substantial" remaining useful lifetime is more than the period of use "24 months" according to the third sale plan (step S16). Accordingly, the "entity 3" is first assigned (step S18). The attribute data on the "entity 3" are updated. Subsequently, all the products in stock are reused (step S15). Thus, 100 newly manufactured products are used to make up for the shortage for the number of products distributed according to the third sale plan. That is, a new "entity 4" is generated (steps S14 to S17). This provides an entity corresponding to the number of products distributed according to the third sale plan.

An attribute table for this entity is shown in FIG. 16. Further, attribute data on the components included in the "entity 4" newly generated are added to the attribute table in FIG. 15.

Then, the product reuse process calculates the remaining useful lifetime of each of the components included in the "entity 1" to "entity 3", which have been assigned. FIG. 17 shows an attribute table updated using the results of the calculations and the attribute data on the components included in the "entity 4" newly generated.

As described above, according to the above embodiment, the circulated business evaluation system which evaluates an environmental load of a circulated life cycle in which a group of products recovered from one of a plurality of markets which differ from each other in customer requests (for example, value lifetimes of the group) is reused and introduced into another of the markets, a cost thereof and a profit thereof; generates an attribute data item of the group, the attribute data item of the group (entity) including a remaining useful lifetime and a product age; determines an introduction order and an introduction rule which are used for introducing the group into the markets, based on the remaining useful lifetime at point in time when the group is recovered from one of the markets and a remaining value lifetime of the group which is obtained by subtracting the product age at point in time when the group is recovered from one of the markets from a value lifetime of another of the markets; and evaluates the environmental load of the circulated life cycle in which the group is introduced into the markets in accordance with the introduction order and rule, the cost thereof and the profit thereof.

(Recovery process in FIG. 26) The circulated business evaluation system updates the remaining useful lifetime of the group, by subtracting a period of use in one of the markets from which the group is recovered; updates the product age of the group, by adding the period of use in one of the markets from which the group is recovered; and evaluates the environmental load of the circulated life cycle in which the group recovered from one of the markets is introduced into another of the markets, the cost thereof and the profit thereof, when the remaining useful lifetime of the group being more than or equal to a given first threshold, and a value obtained by adding a period of use in a certain market whose value lifetime is the longest among the markets to the product age of the group being less than or equal to the value lifetime of the certain market.

(Manufacture process in FIG. 13) The circulated business evaluation system selects the group introduced into each of the markets in accordance with the introduction order and introduction rule, based on the product age of the group, the remaining useful lifetime of the group and one of the markets from which the group is recovered.

(Product reuse process in FIG. 28) The circulated business evaluation system generates the attribute data item of the group and an attribute data item of a component included in the group, the attribute data item of the component including a remaining useful lifetime of the component; updates the remaining useful lifetime of the component, by subtracting a period of use in one of the markets from which the group including the component is recovered; and evaluates the environmental load of the circulated life cycle in which the component whose remaining useful lifetime is less than a period of use in one of the markets in which the group including the component is introduced is replaced with a new component or a reuse component, the cost thereof and the profit thereof.

The introduction order and route for the recovered group are determined so that the group can be efficiently reused (in other words, more profit can be gained from one group). For example, in a reuse business in which reuse products are introduced into a different market segment, it is possible to accurately evaluate impacts on the business profit and environmental loads when the most profit is expected.

Further, it is possible to predicatively evaluate impacts on the business profit and environmental loads when products are reused several times in different market segments. Moreover, the results of the evaluation are effectively used to make a plan for a new reuse business.

In the above embodiment, the markets are classified on the basis of the value lifetime as a customer request. However, the present invention is not limited to this. The present invention produces similar effects even when the markets are classified on the basis of another customer request such as the level of specifications for the product group in each market.

The optimum period of use can also be determined on the basis of the reusable product age in each market segment.

For example, as shown in Equation (3), shown below, an objective function is set as the sum S of periods overlapped between the range of reusable product age in each market segment and the range of the product age at point in time when a period of use in each market segment elapses. Then, the period of use s is determined in which the objective function S is largest. Alternatively, weighting the period over-lapped between the range of reusable product age in each market segment and the range of the product age at point in time when a period of use in each market segment elapses (the weight is "0" when there is no period overlapped, "1" when the period overlapped is shorter than "2" years, "3" when the period overlapped is at least "2" years, "9" when the period overlapped is at least "4" years, and so on). Then, the sum may be set as an objective function. The periods of use in the market segments to be determined may be different or the same.

$$S = \sum_{m=1}^{M} f(m)$$

$$f(m) = \sum_{n=1}^{M} (\text{Min}[A_m + s_m, A_n] - \text{Max}[a_m + s_m, a_n])$$

However, when $(A_m+s_m<a_n) \vee (A_n<a_m+s_m)$ f(m)=0
Market number m, n (m=1~M, n=1~M)
Maximum reusable age Am of market m
Minimum reusable age am of market m
Maximum reusable age An of market n
Minimum reusable age an of market n
Period of use of market m However, am≦Am, an≦An . . .  (3)

For example, the process model setting unit 1c calculates the optimum period of use s in each market as described above. The process model setting unit 1c then updates the period of use in each market segment which is contained in the sale and recovery plan data in FIG. 5. Then, the updated sale and recovery plan data are used to determine a market introduction rule.

With the period of use in each market calculated as described above, products recovered from a certain market after use are certain to have a product age at which they can be introduced into another market. Consequently, the products can be efficiently reused.

The technique described in the embodiment can be distributed by storing it in a recording medium such as a magnetic disk (flexible disk, hard disk, or the like), an optical disk (CD-ROM, DVD, or the like), or a semiconductor memory as a program that can be executed by a computer.

For example, various data are stored in a storage device of a computer, the data being stored in the sale and recovery plan data storing unit 4, product data storing unit 5, LCA data storing unit 6, profit cost data storing unit 7, process storing unit 8, and data storing unit 11, all of which are shown in FIG. 1. Calculating means (including CPU) of the computer execute a program for executing the functions of the life cycle modeling unit 1, simulation executing unit 2, and result output unit 3, all of which are shown in FIG. 1. Consequently, the circulated business evaluation system described above can be realized by the computer.

As described above, according to the above embodiment, it is possible to easily and efficiently evaluate environmental load of a circulated product life cycle targeting a plurality of targets, cost thereof and profit thereof.

What is claimed is:

1. An evaluation apparatus which evaluates environmental load and cost when a group of products is reused in a plurality of markets that differ from each other in value lifetime of the group, the value lifetime of the group in each market being an upper limit of a product age at which the group can be used in each market, the apparatus comprising:
   a generating unit configured to generate an attribute data item of the group including an initial value of the product age of the group, and to generate an attribute data item of a component included in each product of the group, the attribute data item of the component including an initial value of a remaining useful lifetime of the component, and to store the attribute data item of the group and the attribute data item of the component in a memory;
   a simulation executing unit configured (a) to select in turn, from the plurality of markets, one market into which the group is introduced, according to an order determined based on a reusable product age corresponding to each market of the markets, the reusable product age of each market designating the product age of the group at which the group can be introduced into the respective market and being determined by the value lifetime of the respective market and a period of use of the group in respective market, (b) to calculate, for each of calculation step times, the environmental load and the cost of a circulated life cycle in which the group is introduced into the one market selected, (c) to update the product age of the group in the memory, by adding a period of use of the group in the one market selected, (d) to update the remaining useful lifetime of the component in the memory, by subtracting the period of use of the group in the one market selected, and (e) to repeat (a) to (d) until a threshold value obtained by adding a period of use of the group in one of the markets whose value lifetime is the longest among the markets to the product age of the group in the memory is larger than the value lifetime of the one of the markets; and
   a display to display the environmental load and the cost calculated for each calculation step time.

2. The apparatus according to claim 1, wherein the simulation executing unit further calculates, when the threshold value is larger than the value lifetime of the one of the markets, the environmental load and the cost of the circulated life cycle in which the group is disassembled for reuse of components and for material recycling.

3. The apparatus according to claim 1, wherein the simulation executing unit selects the one market from the markets by comparing the product age of the group and the reusable product age corresponding to each market of the markets.

4. The apparatus according to claim 1, further comprising a optimizing unit configured to optimize a period of use of the group in each of the markets so that the product age of the group at a point in time when the group is recovered from one of the markets satisfy a reusable product age corresponding to another of the markets.

5. The apparatus according to claim 1, wherein the simulation executing unit selects the one market from the markets according to the order determined based on the reusable product age corresponding to each market of the markets from which the group is recovered.

6. The apparatus according to claim 1, wherein the simulation executing unit selects the one market from the markets according to the order determined based on reusable product age corresponding to each market of the markets and the environmental load and the cost calculated when each of the markets is selected.

7. The apparatus according to claim 1, wherein the simulation executing unit further calculates the environmental load and the cost of the circulated life cycle in which the component whose remaining useful lifetime in the memory is less than the period of use of the group in the target market that is replaced with a new component or a reuse component.

8. An evaluation method executed in an evaluation apparatus for evaluating environmental load and cost when a group of products is reused in a plurality of markets that differ from each other in value lifetime of the group, the value lifetime of the group in each market being an upper limit of a product age at which the group can be used in each market, the method comprising:

(a) generating an attribute data item of the group including an initial value of the product age, and an attribute data item of a component included in each product of the group, the attribute data item of the component including an initial value of a remaining useful lifetime of the component, and storing the attribute data item of the group and the attribute data item of the component in a memory;

(b) selecting in turn, from the plurality of markets, one market into which the group is introduced, according to an order determined based on a reusable product age corresponding to each market of the markets, the reusable product age of each market designating the product age of the group at which the group can be introduced into the respective market and being determined by the value lifetime of the respective market and a period of use of the group in the respective market;

(c) calculating, for each of calculation step times, the environmental load and the cost of a circulated life cycle in which the group is introduced into the one market selected;

(d) updating the product age of the group in the memory, by adding a period of use of the group in the one market selected;

(e) updating the remaining useful lifetime of the component in the memory, by subtracting the period of use of the group in the one market selected;

(f) repeating (b) to (e) until a threshold value obtained by adding a period of use in one of the markets whose value lifetime is the longest among the markets to the product age of the group in the memory is larger than the value lifetime of the one of the markets; and (g) displaying the environmental load and the cost calculated for each calculation step time.

9. A computer readable medium including computer readable instructions, that when executed, evaluate environmental load and cost when a group of products is reused in a plurality of markets which differ from each other in value lifetime of the group, the value lifetime of the group in each market being an upper limit of a product age of the group that the group can be used in each market, the computer readable instructions comprising:

instruction means for instructing a computer to (a) generate an attribute data item of the group including an initial value of the product age, and an attribute data item of a component included in each product of the group, the attribute data item of the component including a remaining useful lifetime of the component, and to store the attribute data item of the group and the attribute data item of the component in a memory;

instruction means for instructing the computer to (b) select, from the plurality of markets, one market into which the group is introduced, according to an order determined based on a reusable product age corresponding to each market of the markets, the reusable product age of each market designating the product age of the group at which the group can be introduced into the respective market and being determined by the value lifetime of the respective market and a period of use of the group in the respective market;

instruction means for instructing the computer to (c) calculate, for each of calculation step times, the environmental load and the cost of a circulated life cycle in which the group is introduced into the one market selected;

instruction means for instructing the computer to (d) update the product age of the group in the memory, by adding a period of use of the group in the one market selected;

instruction means for instructing the computer to (e) update the remaining useful lifetime of the component in the memory, by subtracting the period of use in the one market selected;

instruction means for instructing the computer to (f) repeat (b) to (e) until a threshold value obtained by adding a period of use in one of the markets whose value lifetime is the longest among the markets to the product age of the group in the memory is larger than the value lifetime of the one of the markets; and instruction means for instructing the computer to (g) display the environmental load and the cost calculated for each calculation step time.

10. The evaluation apparatus according to claim 1, wherein the reusable product age corresponding to each market designates an upper limit of the product age of the group at which the group can be introduced into the respective market and is obtained by subtracting the period of use of the group in the respective market from the value lifetime of the respective market.

11. The evaluation method according to claim 8, wherein the selecting (b) selects, from the markets, a next one market into which the group recovered from the one market selected last is introduced when the threshold value is less than or equal to the value lifetime of the one of the markets, (c) calculates, for each of calculation step times, the environmental load and the cost of a circulated life cycle in which the group is introduced into the next one market selected, (d) updates the product age of the group in the memory, by adding a period of use of the group in the next one market selected, and (e) updates the remaining useful lifetime of the component in the memory, by subtracting the period of use of the group in the next one market selected.

* * * * *